(12) United States Patent
Iwane

(10) Patent No.: US 6,975,810 B2
(45) Date of Patent: Dec. 13, 2005

(54) FOCAL POINT DETECTION DEVICE AND CAMERA

(75) Inventor: Toru Iwane, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/808,412

(22) Filed: Mar. 25, 2004

(65) Prior Publication Data

US 2005/0036780 A1 Feb. 17, 2005

(30) Foreign Application Priority Data

Mar. 26, 2003 (JP) .................................. 2003-086456
Mar. 26, 2003 (JP) .................................. 2003-086457

(51) Int. Cl.[7] .......................... G03B 7/08; G03B 13/36
(52) U.S. Cl. ..................... 396/100; 396/111; 396/121; 396/148; 396/271; 348/341; 348/345
(58) Field of Search ................................ 396/100, 111, 396/121–123, 148, 150, 152, 271; 348/341, 345

(56) References Cited

U.S. PATENT DOCUMENTS

| 4,441,798 A | * | 4/1984 | Watanabe et al. | .......... 396/150 |
| 4,488,799 A | * | 12/1984 | Suzuki et al. | ............... 396/119 |
| 6,226,461 B1 | * | 5/2001 | Homma et al. | ............. 396/150 |
| 6,549,730 B1 | * | 4/2003 | Hamada | ..................... 396/111 |
| 2005/0036779 A1 | * | 2/2005 | Iwane | ........................ 396/111 |

FOREIGN PATENT DOCUMENTS

JP    A 2001-203915    7/2001  .......... H04N/5/225

\* cited by examiner

Primary Examiner—W. B. Perkey
(74) Attorney, Agent, or Firm—Oliff & Berridge, PLC

(57) ABSTRACT

A camera comprises a spatial modulation optical filter that is disposed in a viewfinder optical system for subject observation at or near a position optically equivalent to an estimated image forming plane of a photographic optical system and modulates a subject light flux entering via the photographic optical system with transmission characteristics to obtain a light flux having a predetermined spatial frequency; a photoelectric conversion device that outputs a signal corresponding to detected light; an optical element that guides the subject light flux having been modulated at the spatial modulation optical filter to the photoelectric conversion device; and a focal adjustment state calculation means that calculates a focal adjustment state of the photographic optical system based upon the signal output from the photoelectric conversion device having received the modulated subject light flux.

20 Claims, 21 Drawing Sheets

SUBJECT LIGHT

SUBJECT LIGHT

FOCAL POINT DETECTION DEVICE AND CAMERA

INCORPORATION BY REFERENCE

The disclosures of the following priority applications are herein incorporated by reference:

Japanese Patent Application No. 2003-86456 filed Mar. 26, 2003

Japanese Patent Application No. 2003-86457 filed Mar. 26, 2003

BACKGROUND OF THE INVENTION

1. Field of the Invention

The present invention relates to a focal point detection device adopting a contrast method and a camera having the focal point detection device.

2. Description of the Related Art

Camera AF (autofocus) systems in the related art include the phase difference system adopted mostly in single lens reflex cameras, the external light infrared active system generally adopted in compact cameras and the contrast system adopted in digital compact cameras. The specific AF system used in a given camera is determined primarily in correspondence to the camera type.

While an AF operation in a digital compact camera is executed by using image signals generated at an image-capturing element provided to photograph images, an image cannot always be obtained at an image-capturing element in a single lens reflex digital camera having a main mirror disposed to the front of the image-capturing surface. For this reason, an AF operation is normally executed in the single lens reflex digital camera in the phase difference method by providing an AF sensor in addition to the image-capturing element (see, for instance, Japanese Lain Open Patent Publication No. 2001-203915).

In the phase difference method, the parallax of a light flux passing through two virtual pupils set at an objective lens is detected by a light receiving element such as a CCD and the image plane distance to the focused position and the lens drive distance are calculated based upon the detection results. For this reason, the phase difference method has an advantage in that the focal point detection operation can be executed speedily. In addition, the external light method has an advantage in that the distance to the subject can be ascertained even in darkness since light is emitted from the camera. The contrast method is advantageous in that since data of a captured image are used, the focal point detection can be executed without having to provide a special mechanism and in that the focal point detection can be executed without any adjustment error by directly monitoring the state of the light receiving surface.

However, a single lens reflex camera adopting the phase difference method houses an internal AF detection device, and thus such a camera cannot be provided as a compact unit. In addition, since the state of the light receiving surface is not directly monitored, there is always the potential for an adjustment error.

SUMMARY OF THE INVENTION

A camera according to the present invention comprises a spatial modulation optical filter that is disposed in a viewfinder optical system for subject observation at or near a position optically equivalent to an estimated image forming plane of a photographic optical system and modulates a subject light flux entering via the photographic optical system with transmission characteristics to obtain a light flux having a predetermined spatial frequency; a photoelectric conversion device that outputs a signal corresponding to detected light; an optical element that guides the subject light flux having been modulated at the spatial modulation optical filter to the photoelectric conversion device; and a focal adjustment state calculation means that calculates a focal adjustment state of the photographic optical system based upon the signal output from the photoelectric conversion device having received the modulated subject light flux.

The spatial modulation optical filter modulates a light flux that passes through at least one of a plurality of divided areas within a photographic image plane defined by the photographic optical system.

It is also possible to further provide a plurality of the spatial modulation optical filters being disposed along an optical axis of the photographic optical system, and a light flux modulation control unit that individually controls modulation of the subject light flux and detection of the modulated light flux at the photoelectric conversion device in correspondence to each of the spatial modulation optical filters. The focal adjustment state calculation means may calculate the focal adjustment state of the photographic optical system based upon output signals obtained from the photoelectric conversion device in correspondence to the individual spatial modulation optical filters.

The focal adjustment state calculation means may calculate a light quantity of the modulated light flux detected at the photoelectric conversion device; and it is also possible to provide an autofocus control means that executes a focus operation by moving a focus lens in the photographic optical system to a target focus position set at a focus lens position at which the light quantity calculated by the focal adjustment state calculation means achieves a largest value.

The focal adjustment state calculation means may calculate a light quantity of the modulated light flux detected at the photoelectric conversion device; and it is also possible to further provide an AF calculation unit that calculates a focus lens position at which the light quantity of the modulated light flux detected at the photoelectric conversion device achieves the largest value based upon results of a calculation executed by the focal adjustment state calculation means; and an autofocus control means that moves a focus lens in the photographic optical system to the focus lens position calculated by the AF calculation unit.

The spatial modulation optical filters may be each constituted with a transmission liquid crystal display panel so as to modulate the subject light flux by using a display pattern having transmission characteristics with a predetermined spatial frequency displayed at the liquid crystal display panel.

Furthermore, the light flux modulation control unit may be capable of implementing control so as to achieve a first display state in which the display pattern having the transmission characteristics with the predetermined spatial frequency is displayed and a second display state in which the subject light flux is allowed to be transmitted; and it is possible to further provide a photometric operation unit that executes a photometric operation on the subject light flux based upon the signal output from the photoelectric conversion device in the second display state.

The spatial frequency at the spatial modulation optical filter may be adjustable.

A focal point detection device according to the present invention comprises a spatial modulation optical filter that is disposed in a viewfinder optical system for subject observation at or near a position optically equivalent to an estimated image forming plane of a photographic optical system and can be set in one of a modulation state in which a subject light flux entering via the photographic optical system is modulated with transmission characteristics to obtain a light flux having a predetermined spatial frequency and a transmission state in which the subject light flux is transmitted through; a photoelectric conversion device that outputs a signal corresponding to detected light; an optical element that guides the subject light flux having been modulated at the spatial modulation optical filter to a detection surface of the photoelectric conversion device and guides the subject light flux having been transmitted through the spatial modulation optical filter to the viewfinder optical system; and a focal adjustment state calculation means that calculates a focal adjustment state of the photographic optical system based upon the signal output from the photoelectric conversion device having received the subject light flux that has been modulated at the spatial modulation optical filter.

The spatial modulation optical filter modulates a light flux that passes through at least one of a plurality of divided areas within a photographic image plane defined by the photographic optical system.

The optical element is an element, optical anisotropic characteristics of which change in correspondence to an electrical field applied to the element; and it is also possible to provide an optical element control means that controls the electrical field applied to the optical element so as to guide the subject light flux having been modulated at the spatial modulation optical filter to the detection surface of the photoelectric conversion device and to guide the subject light flux having been transmitted through the spatial modulation optical filter to the viewfinder optical system.

A viewfinder screen of a camera may be disposed at a position optically equivalent to the estimated image forming plane of the photographic optical system.

The optical element is a polymer dispersion liquid crystal constituted of an isotropic polymer and an optically anisotropic liquid crystal achieving refractive indices substantially equal to each other for refracting the subject light flux when the electrical field is applied, which includes a diffraction grating having layers constituted of the isotropic polymer and layers constituted of the liquid crystal disposed in regular order at least in a focal point detection area; and the optical element control means may control the electrical field applied to the diffraction grating so as to guide the subject light flux having been modulated at the spatial modulation optical filter to the detection surface of the photoelectric conversion device and to guide the subject light flux having been transmitted through the spatial modulation optical filter to the viewfinder optical system.

The isotropic polymer layers and the liquid crystal layers that together function as the diffraction grating may be constituted as a hologram formed as a result of interference occurring between parallel light entering the optical element at a right angle to the optical element and a light flux radiated from a point light source provided at a position at which the photoelectric conversion element is to be located.

A focal point detection device according to the present invention comprises a photoelectric conversion device that outputs a signal corresponding to a light quantity of detected light; a polymer dispersion liquid crystal panel that is disposed in a viewfinder optical system for subject light flux observation at or near a position optically equivalent to an estimated image forming plane of a photographic optical system and is constituted with an isotropic polymer and an optically anisotropic liquid crystal achieving refractive indices substantially equal to each other for refracting a subject light flux when an electrical field is applied; a diffraction grating disposed at least at a focal point detection area of the polymer dispersion liquid crystal panel, which includes layers constituted of the isotropic polymer and layers constituted of the liquid crystal disposed in regular order and condenses the subject light flux entering the focal point detection area onto the photoelectric conversion device; a liquid crystal panel control means that forms at the diffraction grating a diffraction pattern with which the subject light flux entering to the diffraction pattern is modulated with transmission characteristics to obtain a light flux having a predetermined spatial frequency by applying an electrical field with a specific pattern to the diffraction grating; and a focal adjustment state calculation means that calculates a focal adjustment state of the photographic optical system based upon the signal output from the photoelectric conversion device.

The liquid crystal panel control means can be set in one of an application mode in which the electrical field with the specific pattern is applied to the diffraction grating and an application OFF mode in which application of the electrical field to the diffraction grating is stopped; and it is also possible to provide a photometric operation unit that executes a photometric operation on the subject light flux based upon the signal output from the photoelectric conversion device in the application OFF mode.

It is also possible to provide a spatial modulation optical filter that is disposed further toward a subject relative to the polymer dispersion liquid crystal panel and can be set in one of a modulation state in which the subject light flux in the focal point detection area is modulated with transmission characteristics to obtain a light flux having a predetermined spatial frequency and a transmission state in which the subject light flux is transmitted through. The liquid crystal panel control means may be set in one of an application mode in which the electrical field achieving the specific pattern is applied to the diffraction grating in the transmission state and an application OFF mode in which application of the electrical field to the diffraction grating is stopped in the modulation state; and the focal adjustment state calculation means may calculate the focal adjustment state in the photographic optical system based upon the signal output from the photoelectric conversion device in the application mode and the signal output from the photoelectric conversion device in the application OFF mode.

DESCRIPTION OF THE PREFERRED EMBODIMENTS

The following is an explanation of the embodiments of the present invention, given in reference to the drawings.

First Embodiment

Figure 1:
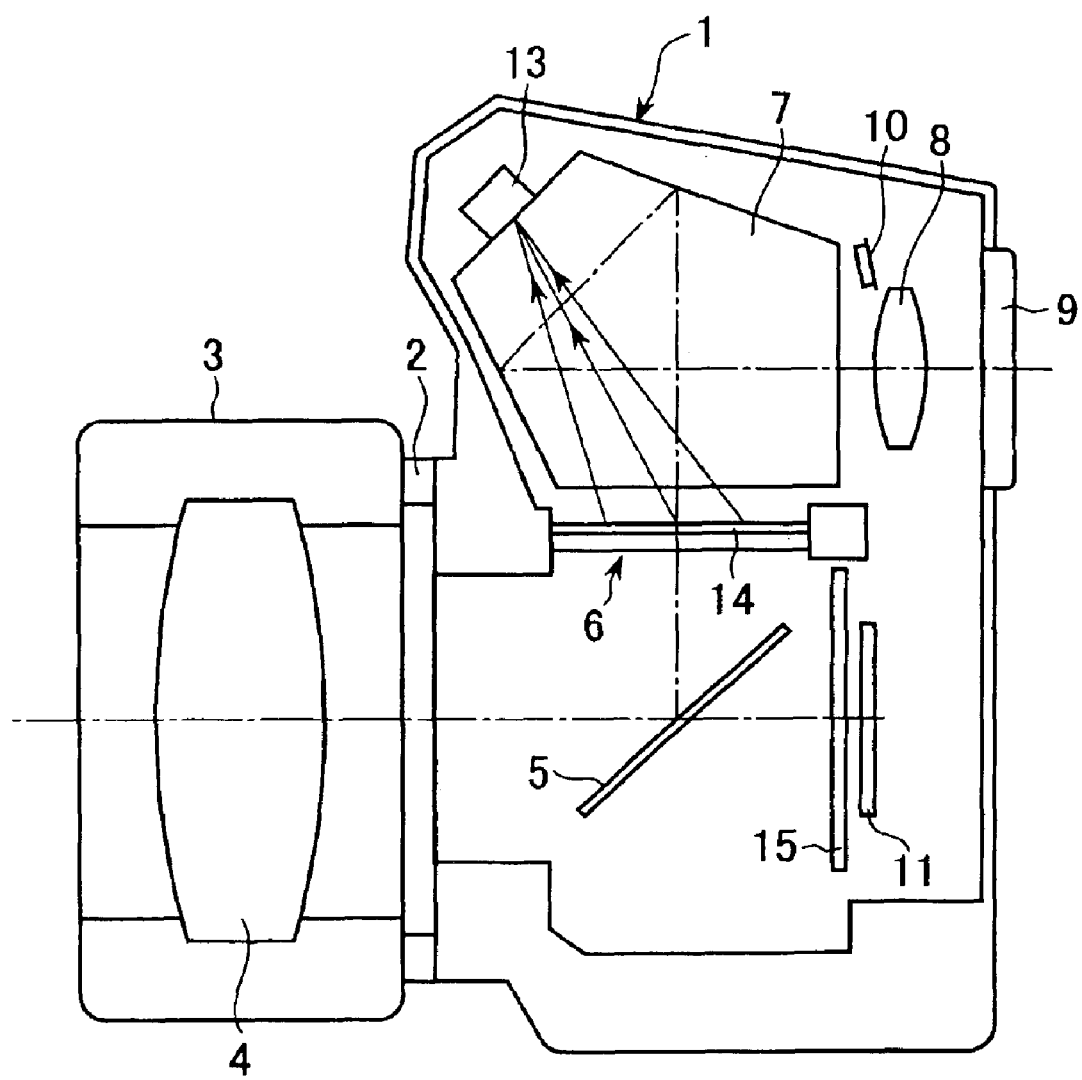
FIG. 1 shows a camera achieved in an embodiment of the present invention.

FIG. 1 shows a camera achieved in an embodiment of the present invention in a schematic sectional view of a single lens reflex digital camera. A lens barrel 3 is mounted at a lens mount 2 of the camera 1. Subject light having passed through a photographic optical system 4 disposed in the lens barrel 3 is reflected at a quick return mirror 5 and forms an image on a liquid crystal optical member 6. The liquid crystal optical member 6 is disposed at a position optically equivalent to an estimated image forming plane of the photographic optical system 4, in the vicinity of a position at which a view finder screen should be set. In this embodiment, an image-capturing element 11 is disposed at the estimated image forming plane of the photographic optical system 4, and the liquid crystal optical member 6 also functions as the viewfinder screen. The image-capturing element 11 is a two-dimensional image-capturing device which maybe a CCD-type, a MOS-type or a CID-type device.

The subject image formed on the liquid crystal optical member 6 can be observed through a viewfinder eyepiece window 9 via a pentaprism 7 and an eyepiece lens 8. In addition, part of the light guided to the pentaprism 7 is further guided to a photo metering sensor 10. A shutter 15 is provided between the quick return mirror 5 and the image-capturing element 11.

A focus area is set within a photographic image plane defined by the photographic optical system 4, and a light flux having passed through the focus area is condensed onto a photoelectric conversion element 13 by a condenser optical element 14 provided at the top of the liquid crystal optical member 6. The photoelectric conversion element 13 is disposed at the pentaprism 7 on its surface that is not used to reflect the viewfinder light flux, i.e., on a first surface. The photoelectric conversion element 13, which may be constituted of a photodiode, a CdS or the like, is capable of detecting the quantity of the light condensed by the condenser optical element 14.

Figure 2:
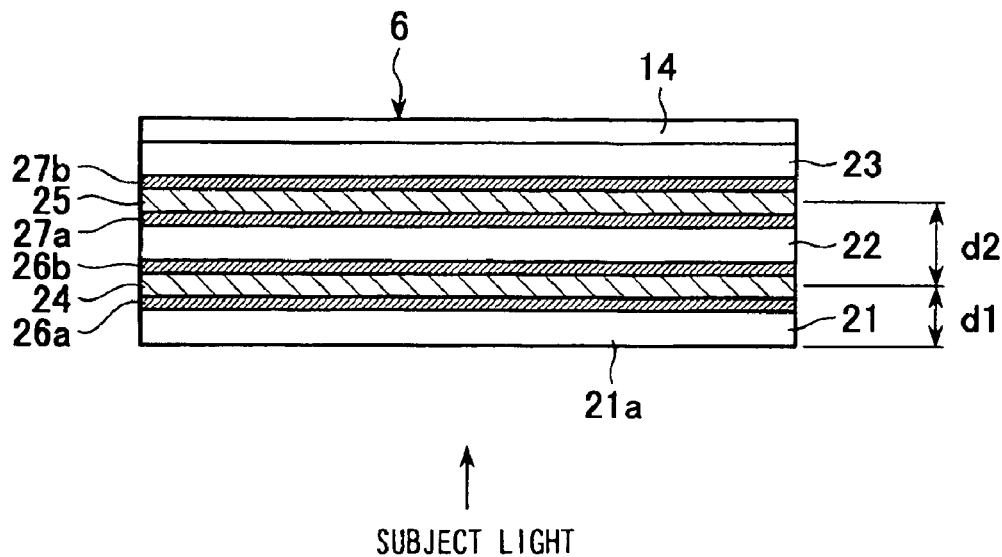
FIG. 2 is a sectional view of a liquid crystal optical member 6.

In the sectional view of the liquid crystal optical member 6 presented in FIG. 2, the subject light enters from the lower side in the figure. Reference numerals 21 to 23 each indicate a transparent substrate such as a glass substrate. At a lower surface 21a of the transparent substrate 21, the viewfinder screen is formed. In the embodiment, the viewfinder screen 21a and the image-capturing surface of the image-capturing element 11 (see FIG. 1) are positioned so that they are optically equivalent to each other relative to the photographic optical system 4.

Reference numerals 26a, 26b, 27a and 27b indicate transparent conductive films (ITOs) formed at the surfaces of the transparent substrates 21, 22 and 23 each facing opposite the next surface and the transparent conductive films each form a specific electrode pattern. A liquid crystal 24 is sealed in between the transparent conductive film 26a and the transparent conductive film 26b, whereas a liquid crystal 25 is sealed in between the transparent conductive from 27a and the transparent conductive film 27b. The condenser optical element 14 is pasted on the upper surface of the transparent substrate 23.

In the embodiment, the liquid crystal layers 24 and 25 are polymer dispersion crystals such as NCAP crystals or PN crystals. In polymer dispersion NCAP crystal, extremely small liquid crystal particles are dispersed within an isotropic high molecule polymer. As a voltage is applied, liquid crystal molecules inside the individual micro particles become aligned with the electric field, and thus, as long as the constant refractive index of the crystal is set equal to the refractive index of the high molecule polymer, incident light does not become scattered and a transparent state is achieved.

However, when no voltage is applied, the liquid crystal molecules take on a random arrangement and thus, incident light is scattered and the liquid crystal becomes non-transparent. The arrangement of the liquid crystal molecules is affected by the voltage level, and thus, by controlling the level of the voltage that is applied, the liquid crystal can be set in a transparent or non-transparent state. It is to be noted that the liquid crystal layers 24 and 25 are positioned over a predetermined distance d2 from each other, and a distance between the liquid crystal layer 24 and the viewfinder screen 21a is set to d1.

Figure 3:
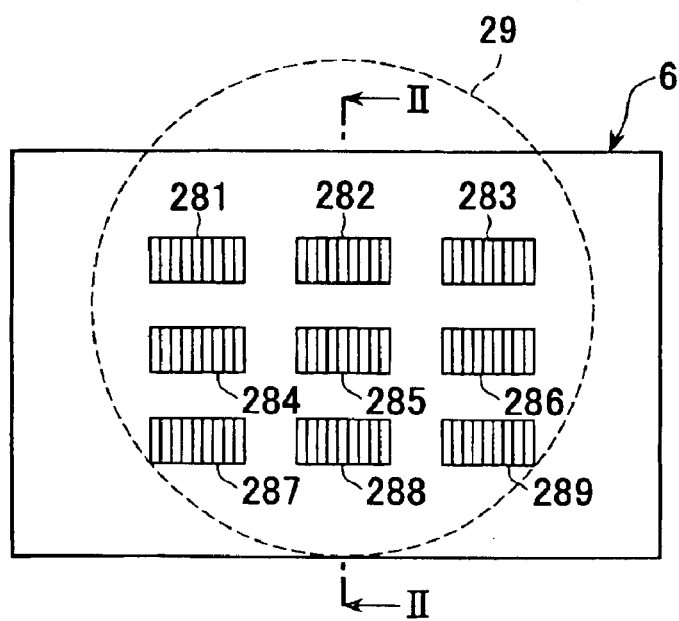
FIG. 3 is a plan view of the liquid crystal optical member 6.

FIG. 3 is a plan view of the liquid crystal optical member 6, showing its focus areas used in an AF operation. In the example presented in FIG. 3, a total of 9 rectangular detection areas 281 to 289 (three disposed along the vertical direction by three disposed along the horizontal direction), are provided as focus areas. In the embodiment, the electrode patterns formed at the transparent conductive films 26a, 26b, 27a and 27b (see FIG. 2) in the detection areas 281 to 289 are dot matrix patterns.

By controlling the voltages applied to the electrode patterns in the detection areas 281 to 289, the states of the liquid crystal layers 24 and 25 can be altered so as to set the liquid crystals over the entirety of a given area in a transparent state or a non-transparent state or to form a stripe pattern having transparent and non-transparent vertical stripes alternating as shown in FIG. 3. The spatial frequency that defines the reiterating cycle of the stripe pattern does not need to be fixed and instead, it may be variable. In addition, a horizontal stripe pattern instead of a vertical stripe pattern may be formed. It is to be noted that the electrode patterns in the detection areas 281 to 289 may be striped electrode patterns instead of dot matrix patterns.

Figure 4:
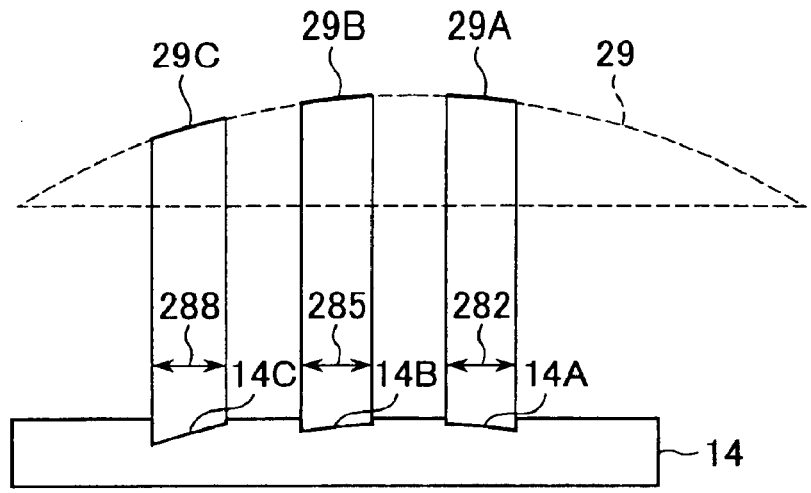
FIG. 4 is a sectional view of a condenser optical element 14, taken along II—II in FIG. 3.

The condenser optical element 14 disposed at the liquid crystal optical member 6 is an optical element that imparts refracting power only within the detection areas 281 to 289. For instance, such an optical element may be achieved by forming lens surface areas of a lens 29 indicated by a dotted-line in FIG. 3, which is decentered from the optical axis corresponding to the detection areas 281 to 289 on the condenser optical element 14 areas of which correspond to the detection areas 281 to 289. FIG. 4 shows the condenser optical element 14 in a sectional view taken along II—II in FIG. 3. Above the condenser optical element 14, the lens 29 is also shown in a sectional view in correspondence to the condenser optical element 14. Reference numerals 29A, 29B and 29C indicate lens surface areas of the lens 29 corresponding to the detection areas 282, 285 and 288 respectively. Surface areas 14A, 14B and 14C are formed in shapes identical to those of the surface areas 29A, 29B and 29C at the detection areas 282, 285 and 288 of the condenser optical element 14, respectively. It is to be noted that the condenser optical element 14 may be achieved as a diffraction grating such as a hologram instead of by forming the surface areas 29A, 29B and 29C at the decentered lens 29.

(AF System)

Figure 5:
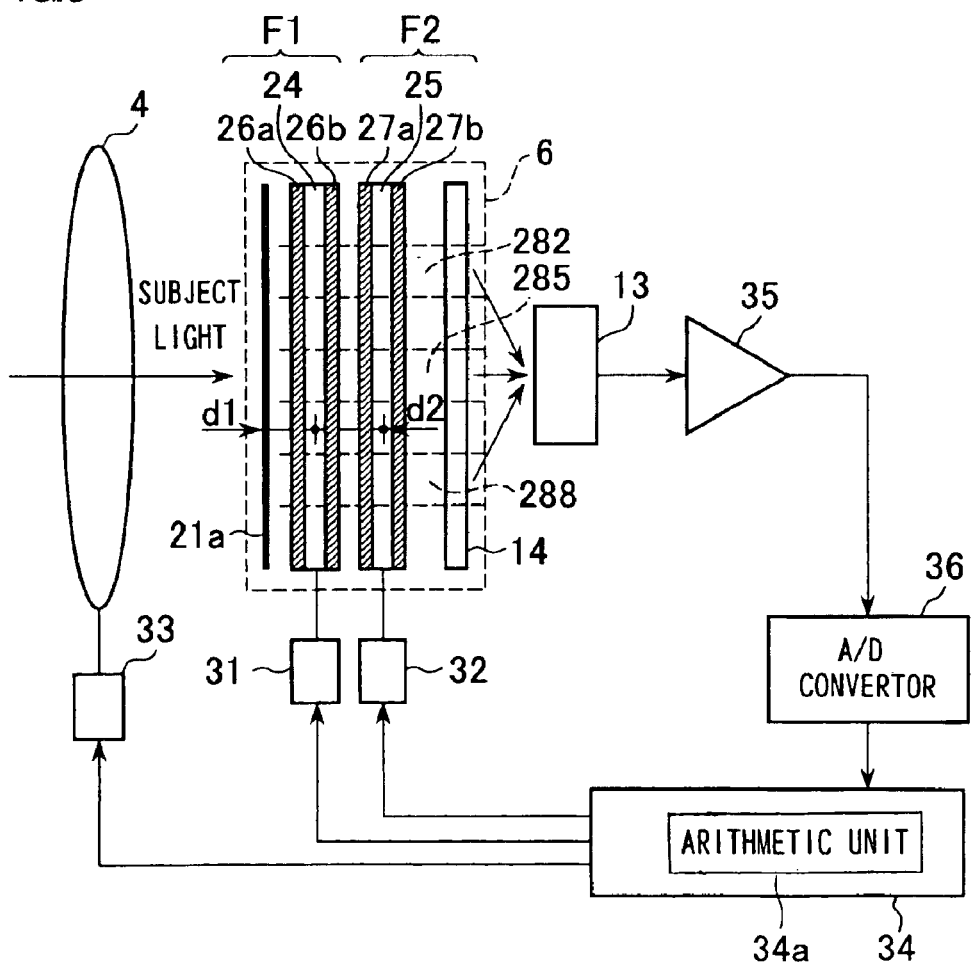
FIG. 5 is a block diagram of the AF system in the camera 1.

FIG. 5 is a block diagram of the AF system in the camera 1. FIG. 5 does not include an illustration of the transparent substrates 21 to 23 (see FIG. 2) at the liquid crystal optical member 6. The liquid crystal layers 24 and 25 at the liquid crystal optical member 6 each function as a filter that executes a Fourier conversion on the subject light, with a filter F1 constituted with the liquid crystal layer 24 and the transparent conductive films 26a and 26b used to alter the state of the liquid crystal layer 24 and a filter F2 constituted of the liquid crystal layer 25 and the transparent conductive films 27a and 27b. The voltage applied to the transparent conductive films 26a and 26b is controlled by a filter control unit 31, whereas the voltage applied to the transparent conductive films 27a and 27b is controlled by a filter control unit 32.

As described earlier, the viewfinder screen 21a of the liquid crystal optical member 6 is disposed at a position optically equivalent to the estimated image forming plane of the photographic optical system 4, and as a focused subject image is formed on the image-capturing element 11 in FIG. 1, a focused subject image is also formed at the viewfinder screen 21a. Reference numeral 33 indicates a lens drive device that controls the drive of the focus lens (not shown) in the photographic optical system 4. As the focus lens in the photographic optical system 4 is driven by the lens drive device 33, the image forming position moves to the left/right in the figure. The lens drive device 33 and the filter control units 31 and 32 mentioned earlier are controlled by a control device 34 of the camera 1.

Light having been transmitted through the detection areas 281 to 289 (see FIG. 3) at the filters F1 and F2 is condensed onto a detection surface of the photoelectric conversion element 13 by the condenser optical element 14. The output from the photoelectric conversion element 13 is first amplified at an amplifier 35, and then an A/D converter 36 converts the amplified output to a digital signal which is then input to the control device 34. Based upon the signals input thereto, an arithmetic unit 34a of the control device 34 calculates the focal adjustment state at the photographic optical system 4. The control device 34 implements autofocus control under which the lens drive device 33 is engaged in autofocus operation, as well as controlling the filter control units 31 and 32.

(Focal Adjustment Operation)
(Acquisition of the Spatial Frequency Component)

In the embodiment, a spatial frequency component in the high-frequency range of the subject light is obtained by displaying stripe patterns to be detailed later at the filters F1 and F2. Then, the focal point is adjusted by moving the focus lens in the photographic optical system 4 to the lens position at which the spatial frequency component indicates a peak value. An explanation is given first on how the spatial frequency component is obtained at the filters F1 and F2.

Figure 6:
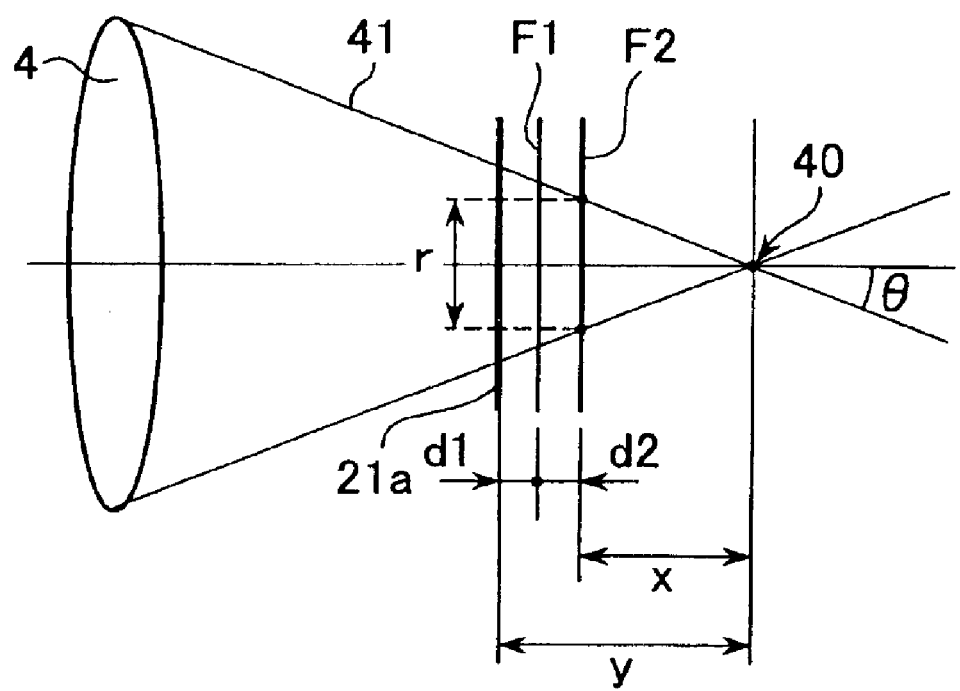
FIG. 6 is provided to facilitate an explanation of a defocus quantity x.

The following explanation is given on an example in which a focal point 40 of the photographic optical system 4 is present at a position x to the right of the filter F2, as shown in FIG. 6. While FIG. 6 shows both the filter F1 and the filter F2, the explanation is given in reference to the filter F2 alone. The extent to which the subject image loses sharpness at the position x can be represented by the diameter r of a plane across which a circular cone 41 having its vertex at the focal point 40 is cut by the filter F2. With θ representing the angle formed by the optical axis and the generating line of the circular cone, the diameter r may be expressed as in (1) below.

$$r = 2x \tan \theta \quad (1)$$

Since tan θ is the product of the reciprocal of the F value (=focal length/aperture) of the lens and ½ in this system, the extent of loss of sharpness r is expressed as in (2) below.

$$r = x/F \quad (2)$$

r may be regarded as the attenuation wavelength at the primary filter. Accordingly, the attenuation f of the subject image resulting from the loss of sharpness at the spatial wavelength R can be expressed as in (3) below.

$$f = 1/(1 + i(x/RF)) \quad (3)$$

I in expression (4) below is the absolute value of f and indicates the attenuation of the spatial frequency component at the wavelength R attributable to the defocus quantity x.

$$I = 1/(1 + (x/RF)^2)^{1/2} \quad (4)$$

I indicates a quantity corresponding to the intensity of the light detected by the photoelectric conversion element 13. In the following explanation, I is referred to as the light intensity.

Figure 7:
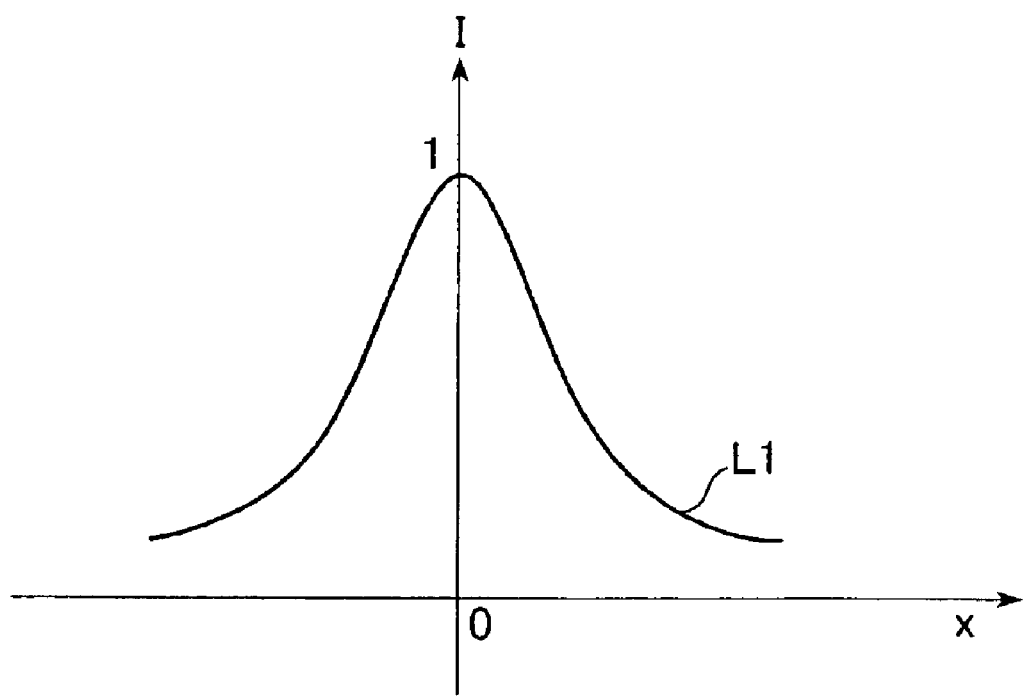
FIG. 7 shows the change in I occurring relative to the defocus quantity x.

A curve L1 in FIG. 7 indicates the change occurring in I relative to the defocus quantity x. When x=0, i.e., when the filter F2 is set at the focal point position 40, I=1 and the value of I decreases as the absolute value of x becomes larger. Expression (4) indicates that the attenuation of the spatial frequency component of the wavelength R is defined by the defocus quantity x. This, in turn, implies that once the spatial frequency component at a specific wavelength R at a specific position on the optical axis is ascertained, the defocus quantity x can be estimated.

Figure 8:
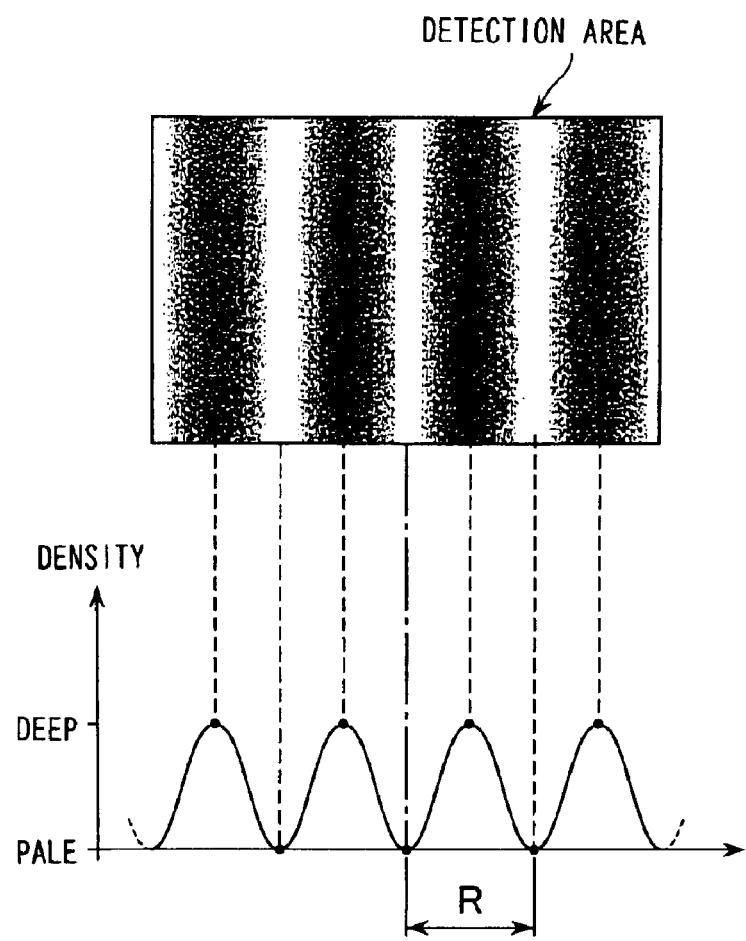
FIG. 8 shows a shaded stripe pattern with a cosine-wave pattern transmittance.

The spatial frequency component at the wavelength R at the specific position may be ascertained through a Fourier conversion of the light flux at the position. When shaded stripes with a transmittance achieving a cosine wave form such as that shown in FIG. 8 are displayed at the detection areas 281 to 289 (see FIG. 3) of the filter F2, a light flux undergoes a Fourier cosine conversion as it is transmitted through the filter F2. Assuming that the spatial wavelength of the shaded stripes in FIG. 8 is R, the intensity of the light flux advancing toward the photoelectric conversion element 13 can be expressed as in (5) below.

$$I_\theta = I_0 \int f(x) \cos \theta_f dx \quad (5)$$

In the expression given above, $I_0$ represents the intensity of the light flux transmitted when the filter F2 is set in a full transmission state, i.e., a state in which the shaded stripe filter pattern is not inserted in the optical path. In addition, $\cos\theta_f$ indicates the Fourier cosine conversion.

$\theta_f$ in expression (5) represents the spatial frequency when the spatial wavelength is R, and $I_\theta$ represents the spatial frequency component at the spatial wave length R. It is to be noted that if a shaded stripe pattern with a transmittance corresponding to a Fourier sine wave is displayed at the filter F2, $I_\theta$ corresponding to the Fourier sine conversion is obtained. Either conversion may be adopted to calculate the focal point position.

As the light flux having been modulated at the filter F2 as described above is received at the photoelectric conversion element 13, the output from the photoelectric conversion element 13 achieves the level of intensity having undergone the Fourier conversion in hardware. If the wavelength R of the shaded or variable-density stripe pattern is altered, the Fourier conversion is executed in correspondence to the adjusted wavelength R. For this reason, the output data measured at different positions x and plotted on the x-I plane in FIG. 7 achieve a curve having a profile identical to that of the curve L1 in FIG. 7.

This means that the contrast of the subject image becomes highest and a focus match is achieved at the position x=0 at which the curve L1 peaks. Thus, the focus lens needs to be moved to the lens position at which the peak position of the curve L1, i.e., the focal point position corresponds to the viewfinder screen 21a.

Figure 9:
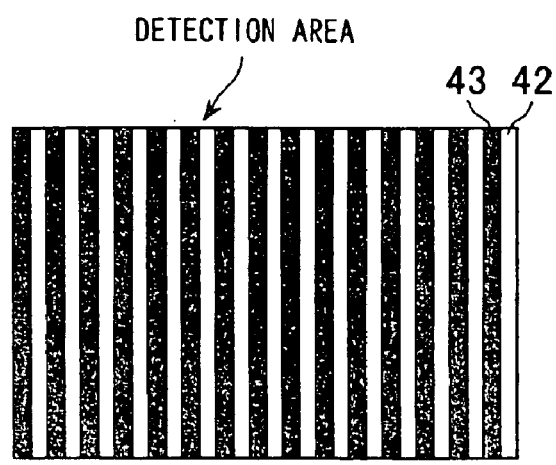
FIG. 9 presents an example of a rectangular wave pattern display.

In the example described above, a uniform cosine-wave pattern or sine-wave pattern is displayed at the detection areas 281 to 289 at the filter F2. As an alternative, a rectangular wave pattern with alternating transmission and non-transmission areas may be displayed. FIG. 9 presents an example of rectangular wave pattern display, with a full transmission vertical stripe area 42 and a full light blocking vertical stripe area 43 alternately reiterating along the horizontal direction. While the rectangular wave pattern is not as desirable as the uniform sine-wave pattern or cosine-wave pattern, the rectangular wave pattern can still be used in a practical application without any problem. Considering the difficulty in achieving a gradation display with a liquid crystal, the rectangular wave pattern, which is simpler, may be easier to handle than the sine-wave pattern or the cosine-wave pattern.

It is to be noted that the output from the photoelectric conversion element 13 will indicate extremely small values if the vertical stripe pattern is used when there is hardly any contrast change along the horizontal direction in the subject, and thus, a horizontal stripe pattern should be formed in such a case. In addition, instead of a vertical stripe pattern or a horizontal stripe pattern, a diagonal stripe pattern may be used. A diagonal stripe pattern can be used in the spatial frequency component extraction either when there is no contrast change along the vertical direction in the subject or when there is no contrast change along the horizontal direction.

(Focal Adjustment Operation)

Next, the displays at the filters F1 and F2 used to obtain the spatial frequency components are explained. As shown in FIG. 3, focal adjustment information, i.e., the spatial frequency component, can be obtained at each of the nine detection areas 281 to 289 within the photographic range in the camera achieved in the embodiment. An explanation is given here on a focal adjustment executed based upon the spatial frequency components obtained in the central detection area 285. Exactly the same principle applies to the focal adjustment executed based upon the spatial frequency component obtained in the other detection areas as that of the focal adjustment executed based upon the spatial frequency component obtained in the detection area 285.

Figure 10A:
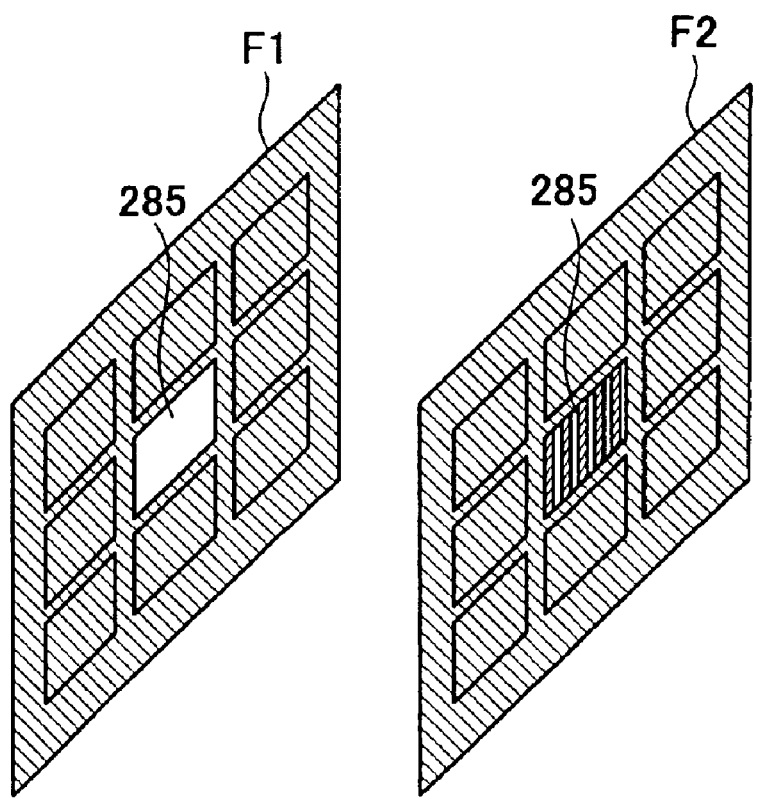
FIG. 10A presents an example of a display at filters F1 and F2 that may be adopted to execute a focusing state detection by displaying a stripe pattern at the filter F2.

When obtaining the spatial frequency component at the filter F2, displays such as those shown in FIG. 10A are achieved at the filters F1 and F2. At the filter F1, the detection area 285 is set in a full transmission state and the areas other than the detection area 285 are set in a full light blocking state. At the filter F2, a stripe pattern with a predetermined spatial frequency is displayed in the detection area 285 and the areas other than the detection area 285 are set in a full light blocking state.

Figure 10B:
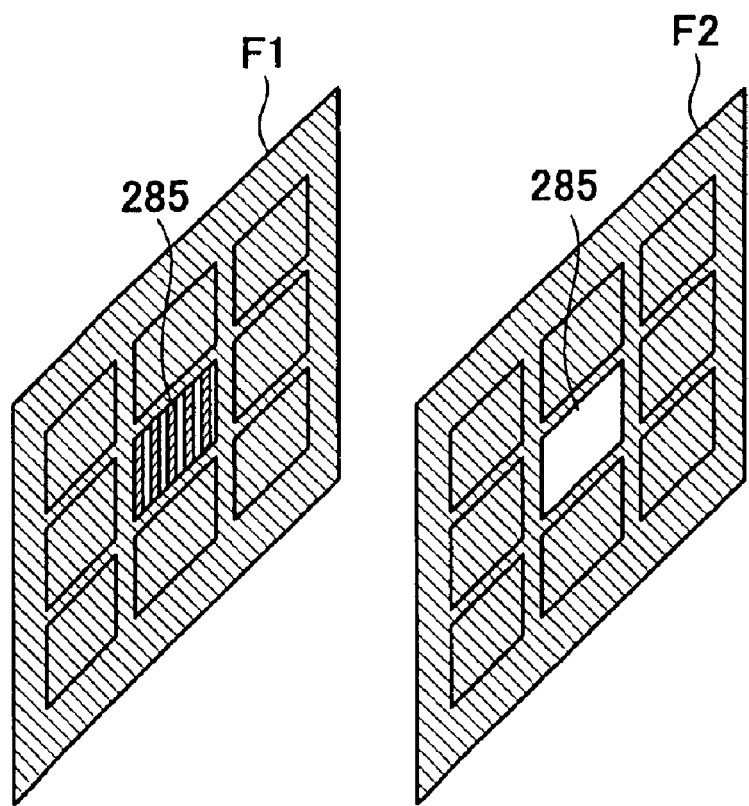
FIG. 10B presents an example of a display at the filters F1 and F2 that may be adopted to execute a focussing state detection by displaying a stripe pattern at the filter F1.

Next, in order to obtain the spatial frequency component at the filter F1, displays such as those shown in FIG. 10B are achieved at the filters F1 and F2. Namely, a display similar to the display at the filter F2 in FIG. 10A is achieved at the filter F1 and a display similar to the display at the filter F1 in FIG. 10A is achieved at the filter F2. It is to be noted that as long as in the areas other than the detection area 285 at least one of the filters F1 and F2 is in a full light blocking state, the corresponding areas at the other filter do not need to be in a full light blocking state (they may be set, for instance, in a full transmission state). However, it is more desirable to set the areas other than the detection area 285 at both the filters F1 and F2 in a full light blocking state in order to cut off the light flux in the areas other than the detection areas 285 with a high degree of efficiency.

By obtaining output values from the photoelectric conversion element 13 in the two display states shown in FIGS. 10A and 10B, two types of data taken at different positions on the optical axis can be obtained with regard a single subject image. In the embodiment, the viewfinder screen 21a is set at a position optically equivalent to the estimated image forming plane, with the filter F disposed at a position set over a distance d1 from the viewfinder screen 21a and the filter F2 disposed at a position set over a distance (d1+d2) from the viewfinder screen 21a.

With y representing the distance from the focal point 40 to the viewfinder screen 21a, as shown in FIG. 6, the distances from the focal point 40 to the filters F1 and F2 are respectively expressed as (y−d1) and (y−(d1+d2)). Thus, the light intensity Za detected in the state illustrated in FIG. 10A is expressed as in (6) below, whereas the light intensity Zb detected in the display state shown in FIG. 10B is expressed as in (7) below.

$$Za=a/(1+((y-d1-d2)/RF)^2)^{1/2} \quad (6)$$

$$Zb=a/(1+((y-d1)/RF)^2)^{1/2} \quad (7)$$

It is to be noted that a in expressions (6) and (7) represents the light intensity detected when the light flux is not attenuated. By using expressions (6) and (7), the distance y to the viewfinder screen 21a and the light intensity "a" when there is no attenuation can be calculated. However, when Za=Zb, the filters F1 and F2 can be assumed to be located over distances equal to each other from the focal point position 40 with the focal point 40 present halfway between them and thus, the focal point 40 is assumed to be at the halfway position between the filters F1 and F2, i.e. at (y−(d1+d2)/2).

Figure 11:
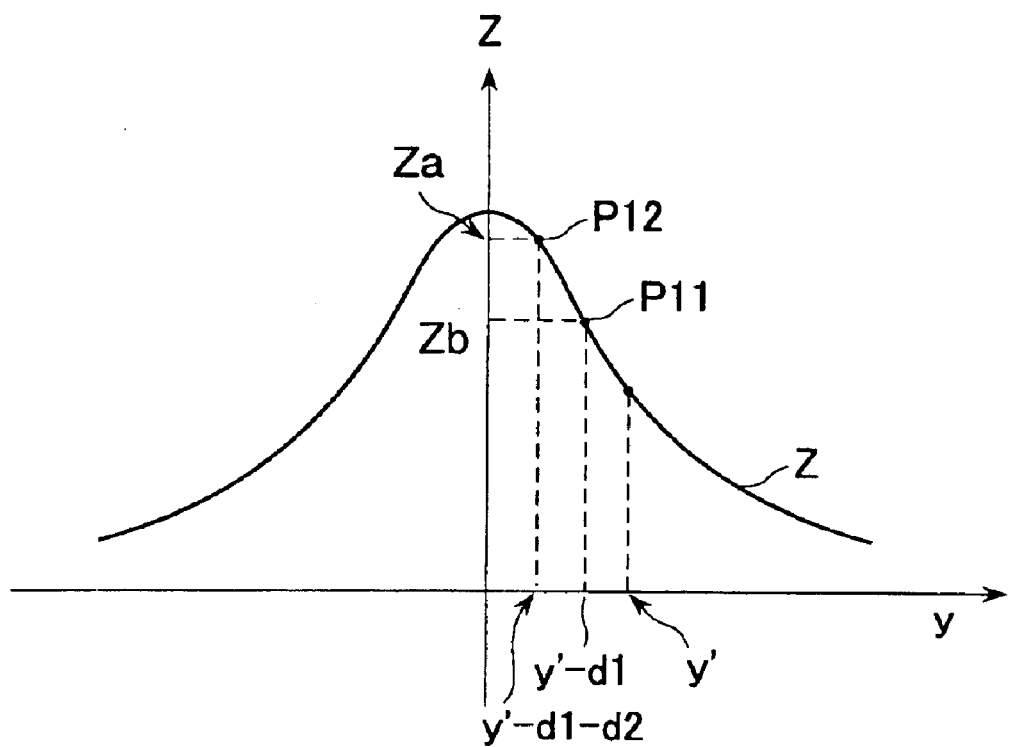
FIG. 11 shows a light intensity curve Z.

FIG. 11 shows a curve $Z=a/(1+(y/RF)^2)^{1/2}$, with y indicating the distance from the image forming position (focal point 40) of the photographic optical system 4. When the distance between the image forming position and the viewfinder screen 21a is y', the positions of the filters F1 and F2 are (y'−d1) and (y'−d1−d2) respectively, and thus, the light intensity levels Za and Zb are indicated by the values of Z at points P 11 and P 12 on the curve Z. Namely, when the light intensity levels Za and Zb take such values, a focused match state can be achieved by adjusting the focus lens position with the lens drive device 33 and moving the image forming position over the distance y' towards the viewfinder screen 21a.

When a focal point detection operation is not being executed, the liquid crystal layers 24 and 25 including their detection areas 281 to 289 are set in a full transmission state. It is to be noted that by setting the detection areas used in the AF operation in a light blocking state over a predetermined length of time following a focus match, the exact position of the subject at which the focus match has been achieved may be visually checked through the viewfinder.

(Filter Pattern)

Figure 12:
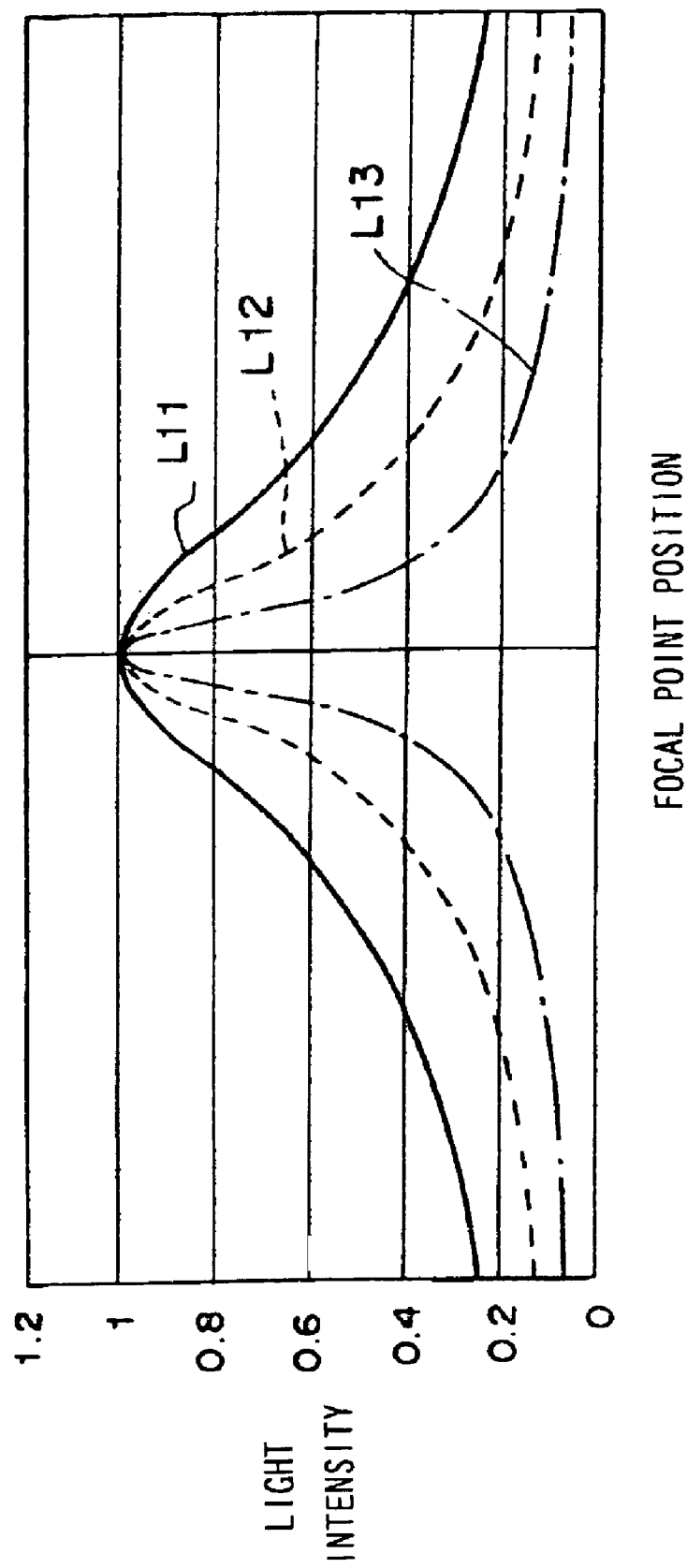
FIG. 12 shows the light intensity I in correspondence to different spatial wavelengths R.

Expression (4) explained earlier indicates that the light intensity I has dependency upon the spatial wavelength R (or the spatial frequency) at the filters F1 and F2. Curves L11 to L13 in FIG. 12 indicate the light intensity level I corresponding to different spatial wavelengths R. The curve L11 indicates the light intensity corresponding to a wavelength R1, the curve L12 indicates the light intensity corresponding to the wavelength R2=R1/2 and the curve L13 indicates the light intensity corresponding to the wavelength R3=R1/4. As FIG. 12 indicates, the curve peaks more sharply as the wavelength R of the stripe pattern is reduced.

For this reason, if the focal point position is close to the filters F1 and F2, a more accurate calculation can be executed by using the curve L13 manifesting a greater change in the vicinity of the focal point position. On the other hand, the data obtained when the focal point position is distanced from the filters F1 and F2 indicate values in the vicinity of the nadirs of the curves L1 to L13 and thus, the focal point position can be calculated with greater ease with the curve L11 manifesting a relatively significant change in the vicinity of its nadir and achieving greater output values.

Namely, a highly accurate focal point position calculation can be executed by increasing the wavelength R of the variable density filter pattern when the defocus quantity x is significant and by reducing the wavelength R when the defocus quantity x is small. For instance, the wavelength R may be initially set to a large value for coarse adjustment and then the wavelength R may be set to a smaller value for fine adjustment during the focal adjustment operation. In addition, if output values having been obtained are smaller than a reference value at which the calculation is enabled, data should be retaken by increasing the wavelength R.

As shown in FIG. 11, by forming the stripe pattern sequentially at the filters F1 and F2, two sets of spatial frequency component data are obtained at the position (y−d1) and the position (y−d1−d2) in correspondence to the same subject. Since the light intensity levels I to be compared with each other relate to the same image, it is desirable that the subject remain still while the data are being obtained. However, in fact, it is likely that the subject will move within the image plane, i.e., that the phase will become offset. This problem of phase offset can be solved by taking the absolute value from the real part and the imaginary part of the Fourier conversion instead of using either the real part (cosine conversion) or the imaginary part (sine conversion) of the Fourier conversion.

More specifically, an absolute value Z expressed as in (8) below may be taken by using data Z cos obtained with an even function (cos) filter pattern displayed at the screen center and data Z sin obtained with an odd function (sin) filter pattern displayed at the screen center.

$$Z=(Z^2\cos+Z^2\sin)^{1/2} \quad (8)$$

While adequate data are normally obtained from the real part alone, the focal point position can be calculated through even more accurate measurement based upon the absolute value Z obtained by displaying such even-function stripes and odd-function stripes. By adopting the latter method, an accurate focal point detection can be achieved even when the image is blurred.

(Photometering Operation)

Figure 13:
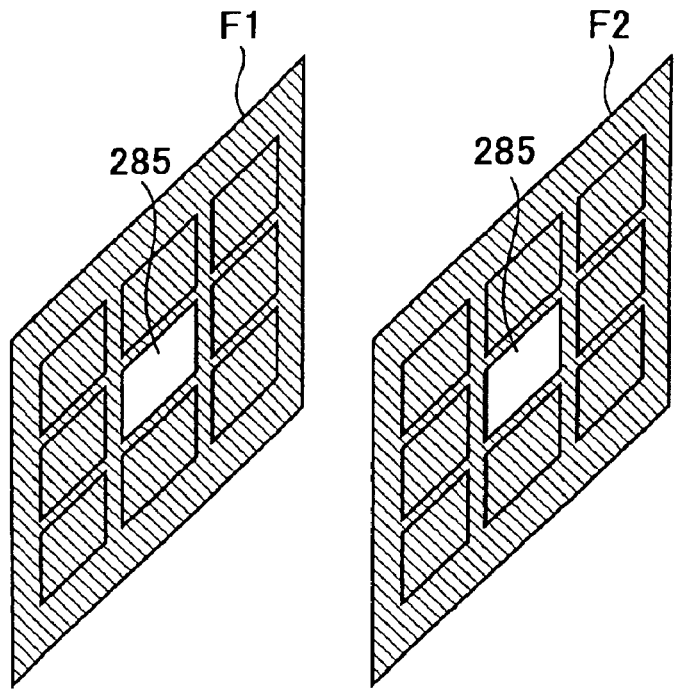
FIG. 13 presents an example of display at the filters F1 and F2 that may be adopted during a photo metering operation.

While the photometering operation is executed at the photometering sensor 10 in the camera shown in FIG. 1, a photometering operation may instead be executed based upon a detection value obtained at the photoelectric conversion element 13. For instance, when executing a photometering operation over the detection area 285 at the screen center, the detection areas 285 at the filters F1 and F2 alone should be set in a full transmission state and other areas should be set in a light blocking state, as shown in FIG. 13. The light intensity detected by setting the detection area 285 in the full transmission state indicates the 0th degree term in the Fourier conversion, i.e., the DC component, which is the light intensity level defined by the detection areas 285. Exactly the same principle as that of the photometering operation of the detection area 285 applies to the photometering operations at other detection areas, i.e., the photometering operation should be executed simply by setting the detection areas to be photometered in the full transmission state. In addition, by sequentially turning off the voltage applied to the individual detection areas 281 to 289 at the condenser optical element 14, photometering values can be obtained in correspondence to the individual detection areas.

Certain restrictions with regard to accuracy are imposed when executing a photometering operation with the photometering sensor 10 since the output of the photodiode constituting the light receiving element is directly used as the absolute value and thus there is the inevitable influence of the dark current. If, on the other hand, the photometering operation is executed by using the photoelectric conversion element 13 as described above, a dark state can be created simply by setting the filters F1 and F2 in a fully light blocking state and, as a result, the effective light intensity alone can be measured as the difference between full transmission state and the full light blocking state. Thus, a highly accurate photometering operation can be executed. It is to be noted that by setting the entire areas of the filters F1 and F2 in the full transmission state, a photometering operation can be executed through full screen averaging with the photometering sensor 10.

When the photoelectric conversion element 13 is also utilized as a photometering sensor and a range finding sensor as described above, the photoelectric conversion element 13 may be disposed at a position at which the photometering sensor 10 is located in FIG. 1. Since the light flux is not deflected at the condenser optical element 14 to a significant extent, the subject image observed at the viewfinder does not become dark in such a case.

While two filters each constituted of a liquid crystal layer and a pair of transparent conductive films disposed on the two sides of the liquid crystal layer are used in the first embodiment described above, three or more such filters may be utilized or a single such filter may be utilized instead. However, if the camera includes a single filter, only one expression, eg., either expression (6) or expression (7), can be obtained and, for this reason, the focal point position cannot be determined through a calculation. Accordingly, when a single filter is used, an autofocus operation should be executed by adopting the so-called "hill-climbing method" which is to be detailed later. It is to be noted that since there is no risk of any light flux entering the detection area from another area, the areas other than the detection area do not need to be set in a light blocking state (the dark state) in a camera having a single filter.

(Hill-climbing Autofocus Operation)

Figure 14:
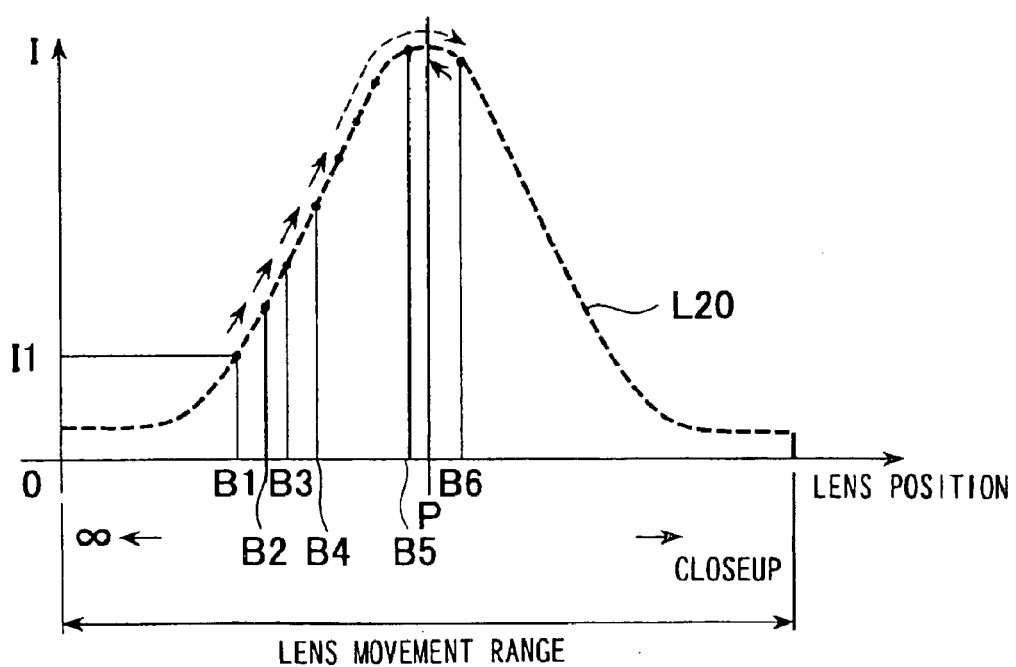
FIG. 14 shows a pattern of focus lens movement when executing focus adjustment in hill-climbing method.

As the focus lens in the photographic optical system 4 is moved through the full range over which it is allowed to move, the intensity I is detected at the photoelectric conversion element 13 as indicated with a curve L20 in FIG. 14. An intensity I 1 is detected at the focus lens position B1 at the time of AF operation start. In the "hill-climbing" method, the intensity I is detected each time the focus lens moves over a predetermined distance and is stored in memory. Then, the detected intensity I is compared with the intensity I stored in memory and the focus lens is moved to the direction along which the intensity I increases.

In the example presented in FIG. 14, the focus lens is moved from lens position B1 to lens position B2, to lens position B3 and then to lens position B4. The intensity I detected by moving the focus lens from the lens position B5 to lens position B6 is lower than the intensity detected at lens position B5. Namely, by detecting the intensity I having increased starts decreasing, the passage of the focus lens over a peak position P can be recognized. Under such circumstances, the focus lens is made to move backward to the peak position.

Figure 15:
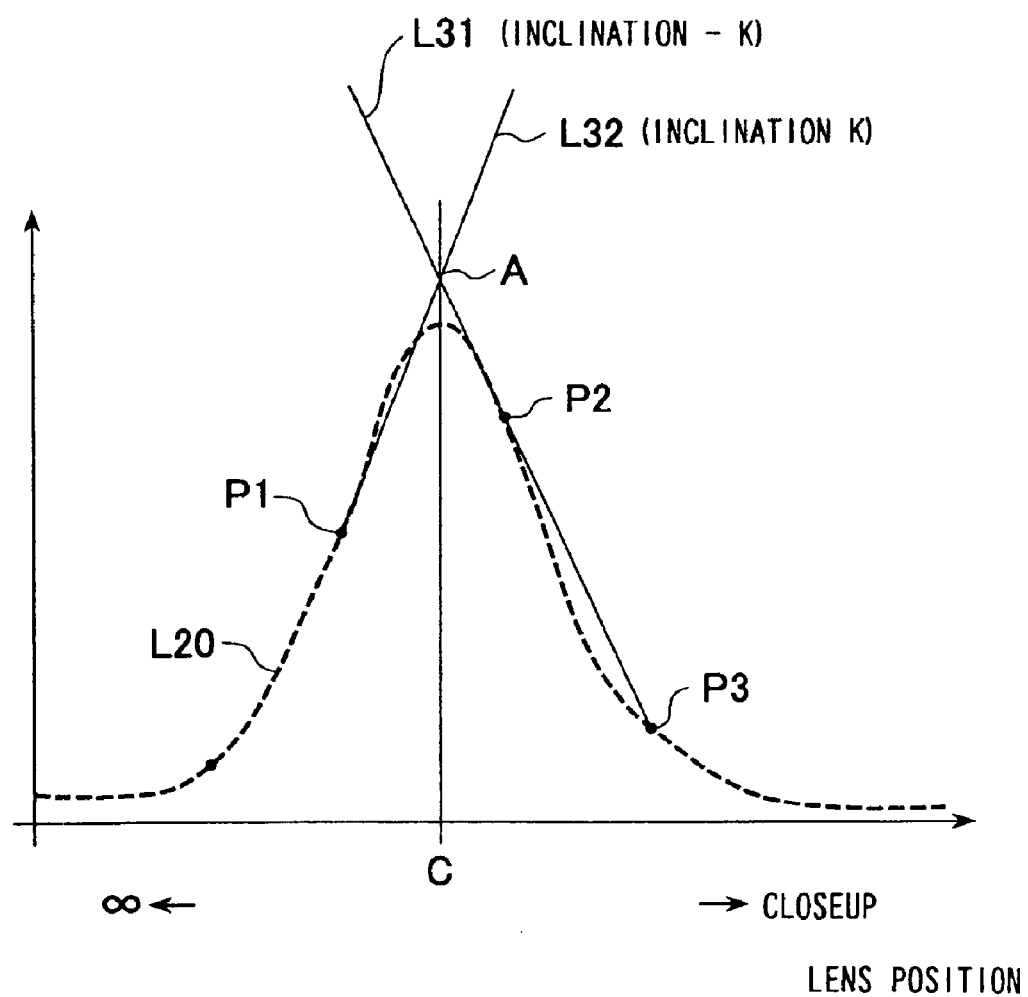
FIG. 15 illustrates the principle of a 3-point interpolation calculation.

The peak position may be determined based upon the detected intensity levels I through, for instance, a 3-point interpolation calculation. FIG. 15 illustrates the principle of the 3-point interpolation calculation, which is executed by using intensity data sequentially obtained at positions P1, P2 and P3. In this example, the intensity I switches from an increasing trend to a decreasing trend with the data P2.

Accordingly, as the data P3 are obtained, a straight line L31 passing through the points P2 and P3 is obtained. With—K indicating the inclination of the straight line L31, a straight line L32 with an inclination K passing through the point P 1 is obtained through calculation. The intersection point A at which the straight line L31 and the straight line L32 intersect each other is then determined. The coordinates of the intersection point A are indicated based upon the lens position and the intensity level, and by moving the focus lens to the lens position C corresponding to the intersection point A, a focused subject image can be formed on the image-capturing element 11 (see FIG. 1).

When the "hill-climbing" method is adopted, too, the spatial wavelength R of the stripe pattern may be adjusted so as to increase the wavelength R over a range in which the intensity does not change much (in the vicinity of the nadir of the curve L20) and to reduce the wavelength R as the change in the intensity becomes more significant. It is to be noted that while an explanation is given above on the hill-climbing method adopted in the focal point detection executed in conjunction with a single filter, the "hill-climbing" method may also be adopted in conjunction with a plurality of filters.

Figure 16:
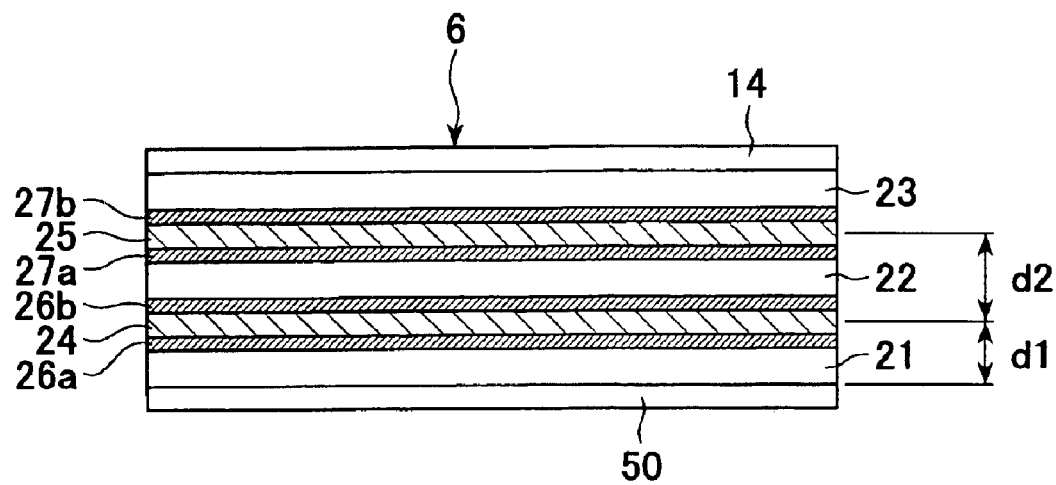
FIG. 16 is a sectional view of the liquid crystal optical member 6 having a viewfinder screen 50 which is formed separately.

While the viewfinder screen 21a is formed at the lower surface of the transparent substrate 21 of the liquid crystal optical member 6 shown in FIG. 2, a liquid crystal optical member 6 and a viewfinder screen 50 may be provided as separate members, as shown in FIG. 16, instead. In addition, a semi-transparent state such as that of frosted glass can be achieved in the liquid crystal layers 24 and 25 constituted of polymer dispersion crystals by adjusting the level of the voltage applied thereto. Accordingly, instead of the viewfinder screen 21a or 50, either the liquid crystal layer 24 or the liquid crystal layer 25 maybe set in a semi-transparent state and used as a viewfinder screen.

Figure 17:
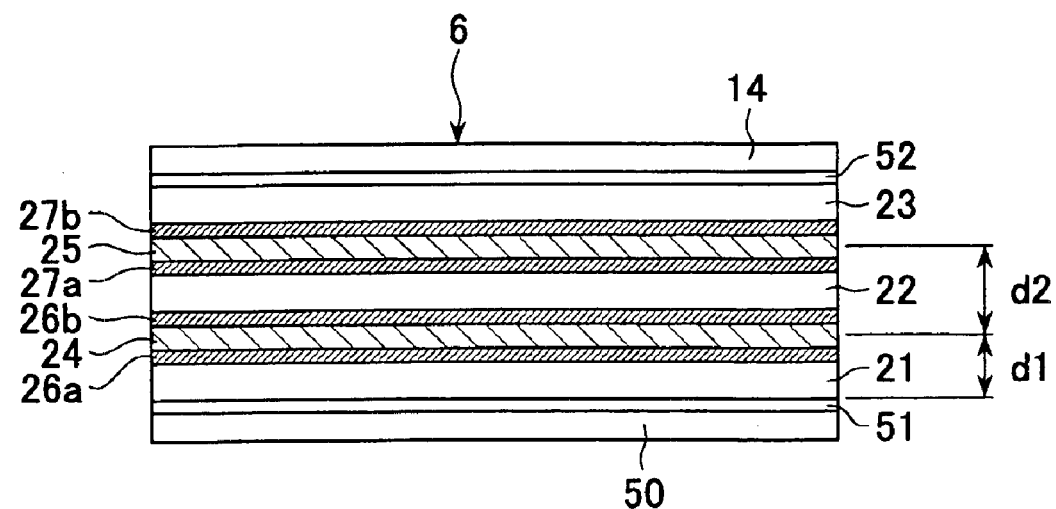
FIG. 17 is a sectional view of the liquid crystal optical member 6 having filters F1 and F2 constituted of TN liquid crystal or STN liquid crystal.

Also, various marks and symbols maybe displayed in areas other than the detection areas 281 to 289 at the liquid crystal layers 24 and 25 to be used as a viewfinder display. It is to be noted that while polymer dispersion liquid crystals are used as the liquid crystal layers 24 and 25 at the filters F1 and F2 in the embodiment explained above, liquid crystals other than polymer dispersion liquid crystals may instead be used for the liquid crystal layers 24 and 25. However, if the liquid crystal optical member 6 is constituted by using TN liquid crystals or STN liquid crystals, it needs to include polarizing plates 51 and 52, as shown in FIG. 17.

The first embodiment described above achieves the following advantages.

(1) By disposing the liquid crystal optical member 6 at the position at which a focus screen is normally disposed in a single lens reflex camera, the focused state of the viewfinder image being observed can be directly evaluated.

(2) By utilizing a plurality of filters, the focal point position (image forming position) can be ascertained through calculation, and thus, the focus lens can be made to move to the focused position quickly. In other words, a level of quick shot capability equivalent to that of the phase difference system can be realized in a camera adopting the contrast method in which the image forming surface is directly monitored.

(3) Since the spatial frequency component in the subject light flux is extracted in hardware by utilizing the liquid crystal optical member 6 and the photoelectric conversion element 13, the arithmetic operation load can be reduced compared to that in an AF mechanism adopting the conventional contrast method.

(4) Numerous detection areas to be used to evaluate the focused state can be disposed at any position on the screen with ease without resulting in an increase in the production cost.

(5) While detection areas are formed at predetermined positions in the embodiment described above, detection areas can be moved around freely within the screen at a liquid crystal filter adopting the dot matrix method depending upon the type of the subject and the position of the subject.

(6) As both the focal point detection and the photometering operation can be executed with the liquid crystal optical member 6 and the photoelectric conversion element 13, the number of required parts and the production costs can be reduced.

Second Embodiment

Figure 18:
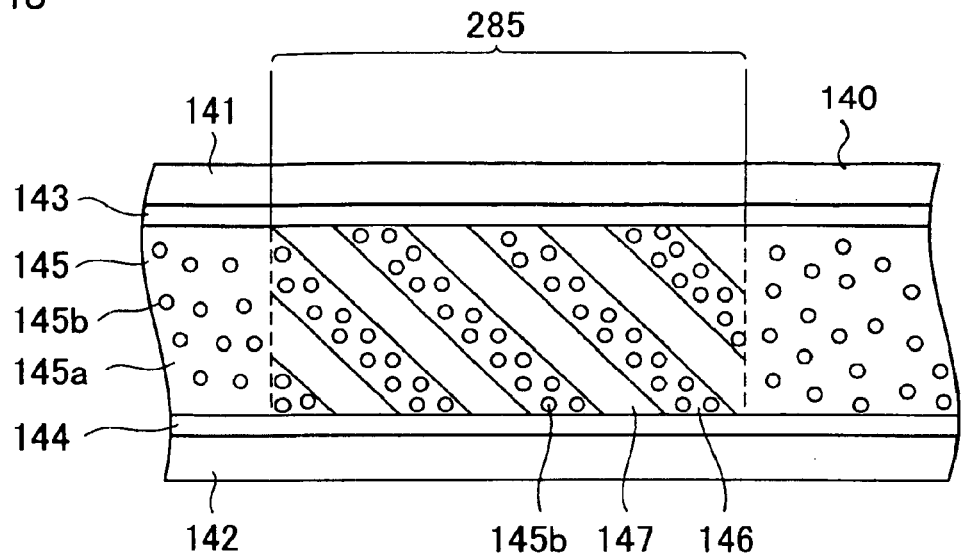
FIG. 18 is a sectional view of a detection area 285 at a condenser optical element 140.

In the first embodiment described above, the surfaces of the detection areas 281 to 289 at the condenser optical element 14 have a contour identical to the surface contour of the lens 29, as shown in FIGS. 3 and 4, to condense light passing through the detection areas 281 to 289. In the second embodiment, a condenser optical element 140 constituted of an optically anisotropic liquid crystal and a transparent isotropic polymer is used instead of the condenser optical element 14 described above. The condenser optical element 140, which functions as a diffraction grating, adopts a structure shown in the sectional view in FIG. 18. FIG. 18 is a schematic sectional view of the detection area 285 at the condenser optical element 140, taken along the horizontal direction in FIG. 3.

Reference numerals 141 and 142 in FIG. 18 each indicate a glass substrate, and electrode patterns are formed with transparent conductive films 143 and 144 at the surfaces of the glass substrates 141 and 142 facing opposite each other. At the transparent conductive films 143 and 144, electrodes used to apply a voltage to the individual detection areas 281 to 289 (see FIG. 3) and electrodes used to apply a voltage to areas other than the detection areas are formed. Between the glass substrate 141 having the transparent conductive film 143 formed thereat and the glass substrate 142 having the transparent electrode 144 formed thereat, a polymer dispersion liquid crystal member 145 achieved by dispersing liquid crystal particles 145b in a high molecule polymer 145a is held.

At the polymer dispersion liquid crystal member 145, the liquid crystal particles 145b are uniformly dispersed in the high molecule polymer 145a, except for in the detection area 285. Over the area corresponding to the detection area 285, on the other hand, a layered structure is achieved with a layer 146 containing the liquid crystal particles 145b at a high density and a layer 147 containing the liquid crystal particles 145b at a low density alternating with each other. This layered structure is a cyclic structure matching the cycle of interference fringes, and the portion corresponding to the detection area 285 constitutes a 3-D hologram or volume hologram.

Figure 19:
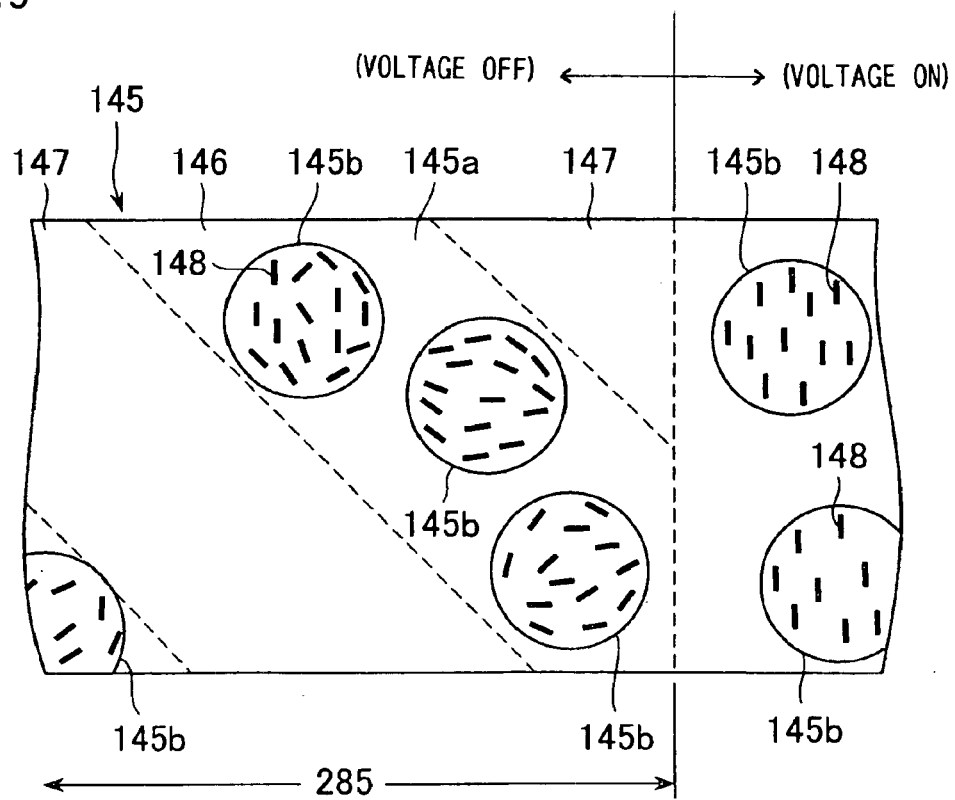
FIG. 19 illustrates the operation of the hologram in a schematic partial sectional view of a polymer dispersion liquid crystal member 145 with no voltage applied to the electrode at the detection area 285.
Figure 20:
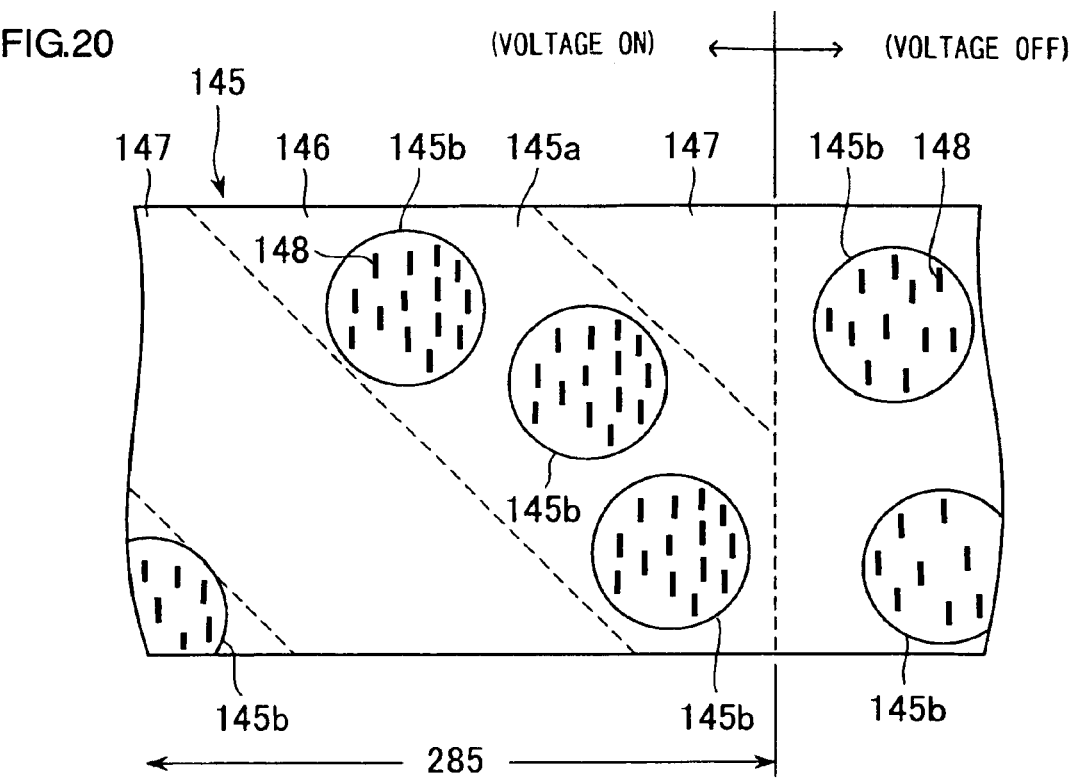
FIG. 20 illustrates the operation of the hologram in a schematic partial sectional view of the polymer dispersion liquid crystal member 145 with a voltage applied to the electrode at the detection area 285.
Figure 21:
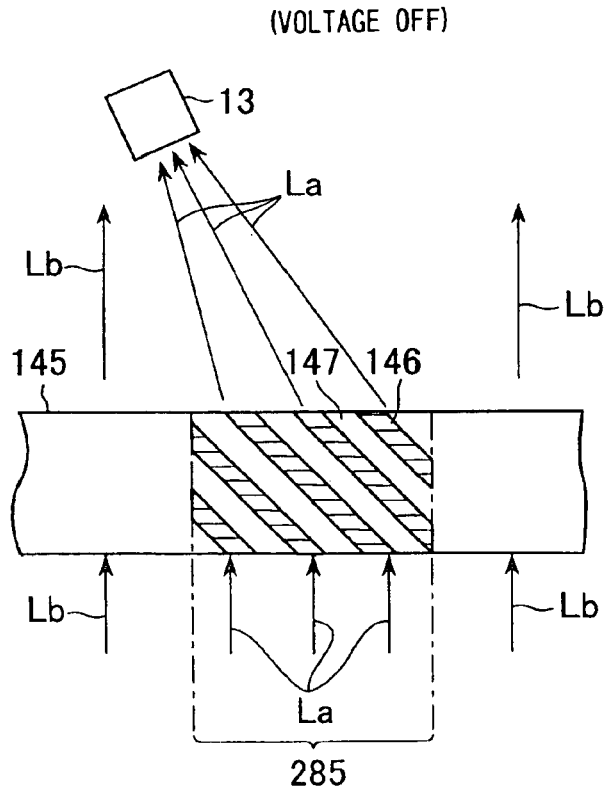
FIG. 21 indicates the direction along which the subject light flux advances when no voltage is applied to the electrode at the detection area 285.
Figure 22:
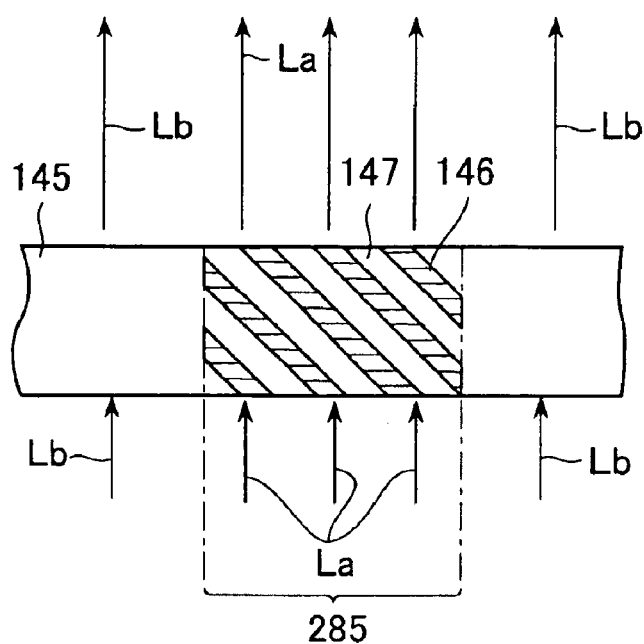
FIG. 22 indicates the direction along which the subject light flux advances when a voltage is applied to the electrode at the detection area 285.

FIGS. 19 to 22 illustrate the operation of the hologram formed at the detection area. FIGS. 19 and 20 each present a schematic sectional view of the polymer dispersion liquid crystal member 145, whereas FIGS. 21 and 22 each illustrate the direction along which the subject light flux advances. FIGS. 19 and 21 show a state in which no voltage is applied to the electrodes corresponding to the detection area 285 with a voltage being applied to the electrodes at the other areas. FIGS. 20 to 22 show a state in which a voltage is applied to the electrode corresponding to the detection area 285 as well.

Reference numeral 148 in FIGS. 19 and 20 indicates a liquid crystal molecule inside a liquid crystal particle 145b. The liquid crystal molecule 148 has two refractive indices, i.e., an ordinary refractive index "no" corresponding to the major axis of the index ellipsoid and an extraordinary refractive index "ne" corresponding to the minor axis of the index ellipsoid. At the polymer dispersion liquid crystal member 145, either the ordinary refractive index "no" or the extraordinary refractive index "ne" is set equal to a refractive index "np" of the isotropic high molecule polymer 145a.

At the detection area 285 with no voltage applied to the electrode, the liquid crystal molecules 148 are randomly oriented inside the liquid crystal particles 145b, as shown in FIG. 19, scattering light having entered the polymer dispersion liquid crystal member 145. As a result, the area constituted with the layers 146 and 147, i.e., the detection area 285 of the polymer dispersion liquid crystal member 145, functions as a diffraction grating. In the embodiment, a subject light flux La having entered the detection area 285 is diffracted at the diffraction grating constituted of the layers 146 and 147 and is condensed onto the photoelectric conversion element 13, as shown in FIG. 21.

In the area other than the detection area 285 in FIG. 19, on the other hand, an electrical field is generated along the vertical direction in the figure due to the voltage applied thereto, orienting the liquid crystal molecules 148 along the direction in which the electrical field is generated. In the embodiment, the polymer dispersion liquid crystal member 145 becomes transparent over the area to which the voltage is applied by setting the refractive index of the oriented liquid crystal and the refractive index of the high molecule polymer 145a equal to each other. Thus, a light flux Lb having entered an area other than the detection area 285 is transmitted through the transparent polymer dispersion liquid crystal member 145 without becoming diffracted and is guided toward the viewfinder eyepiece window 9 via the pentaprism 7 and the eyepiece lens 8 (see in FIG. 1).

In the state shown in FIG. 20, the voltage is also applied to the electrode at the detection area 285 and thus, the liquid crystal molecules 148 in the layers 146, too, are oriented along the electrical field (along the vertical direction in the figure). As a result, the light fluxes La and Lb having entered the polymer dispersion liquid crystal member 145 are both transmitted without becoming diffracted and are both guided to the viewfinder eyepiece window 9 via the pentaprism 7 and the eyepiece lens 8, as shown in FIG. 22.

The operation at the condenser optical element 140 is summarized below.

(a) When the focal point detection operation is not executed, the entire area of the condenser optical element 140 is set in a transmission state. Thus, the subject light flux having been transmitted through the filters F1 and F2 is guided to the viewfinder optical system in its entirety.

(b) When executing a focal point detection at the detection area 285, the voltage application to the detection area 285 is turned off. As a result, the part of the subject light flux being transmitted through the detection area 285 alone becomes deflected and is condensed onto the photoelectric conversion element 13. The subject light flux being transmitted through the other areas is guided to the viewfinder optical system without becoming deflected.

It is to be noted that while the layers 146 and 147 are formed only at the detection areas 281 to 289 in the condenser optical element 140 explained above, layers 146 and 147 may be formed over the entire condenser optical element 140 since the area other than the detection areas 281 to 289 remains in a transparent state with the voltage being applied thereto at all times. In such a condenser optical element 140, too, the diffractive function is achieved only at a detection area the voltage application to the electrode thereof has been turned off.

Figure 23:
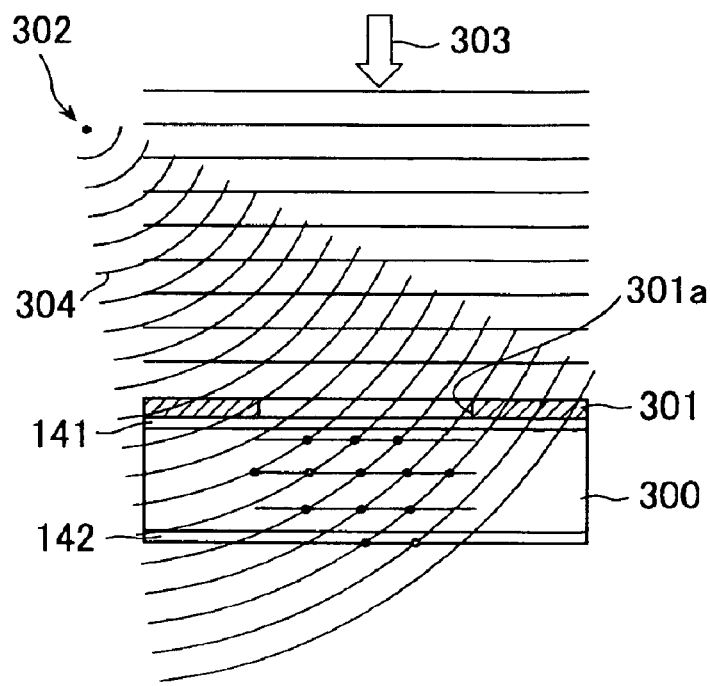
FIG. 23 shows the method adopted to form the condenser optical element 140.

FIG. 23 illustrates how the condenser optical element 140 may be prepared. First, a liquid crystal and a photo-curing monomer are mixed together to disperse the liquid crystal in the monomer. Next, the liquid mixture is poured into the space between the pair of glass substrates 141 and 142 having the transparent conductive films 143 and 144 formed thereat respectively, thereby forming a sample 300. A mask 301 having openings 301a each corresponding to one of the detection areas 281 to 289 is formed at a surface of the sample 300. The sample 300 is set as shown in FIG. 23.

Reference numeral 302 in FIG. 23 indicates a point light source that emits a light flux 304, and reference numeral 303 in FIG. 23 indicates a parallel light flux used as reference light. When the light advancing paths are reversed, the light flux 304 can be considered to be equivalent to light condensed onto the point light source 302, and the parallel light flux 303 can be regarded to be equivalent to light emitted from the sample 300 along the vertical direction. The positional relationship between the sample 300 and the point light source 302 is identical to the positional relationship between the condenser optical element 14 and the photoelectric conversion element 13 shown in FIG. 1, and the point light source 302 is disposed at a position matching that of the detection surface of the photoelectric conversion element 13. The parallel light flux 303 enters the sample 300 at a right angle. The light flux 304 and the parallel light flux 303 are both coherent light such as laser light.

As the sample 300 having the mask 301 formed thereat is irradiated with the light flux 304 and the parallel light flux 303, interference fringes are formed by the two light fluxes 303 and 304 over an area that is not covered with the mask 301 at the sample 300. In the liquid mixture containing the monomer and the liquid crystal, the polymer density increases in a portion in which the light intensity has increased due to interference and the photo-polymerization of the monomer has progressed to a considerable extent. In contrast, in a portion of the liquid mixture in which the light intensity is low, the liquid crystal density rises as the monomer in the portion has been attracted to the high light intensity portion. As a result, a hologram constituted of layers 147 with a low liquid crystal density and layers 146 with a high liquid crystal density such as that shown in FIG. 18 is formed within the polymer dispersion liquid crystal member 145. The layered structure achieved with the layers 146 and 147 is identical to the structure of the interference fringes.

It is to be noted that a hologram may be formed over the entire area of the polymer dispersion liquid crystal member 145 without using the mask 301.

Figure 24:
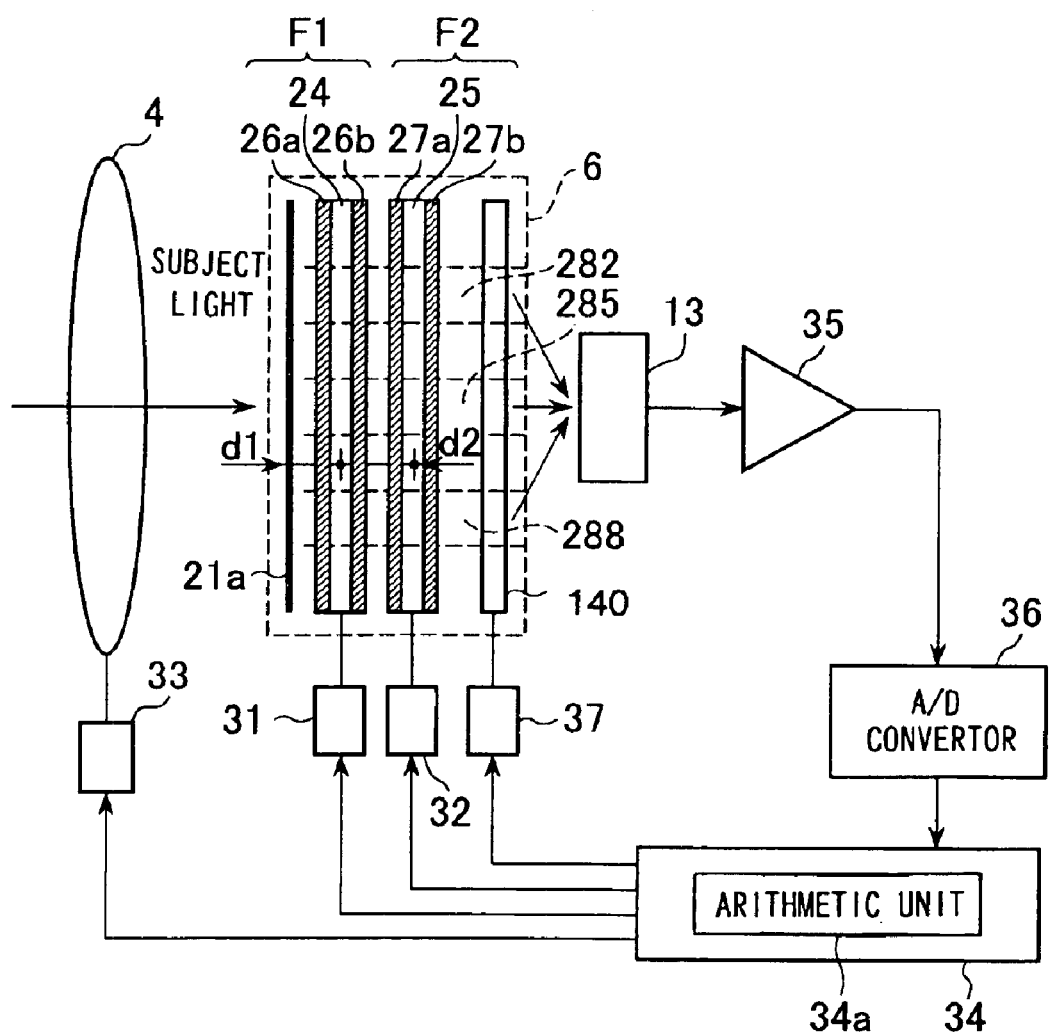
FIG. 24 is a block diagram of the AF system achieved in a second embodiment.

FIG. 24 is a block diagram of the AF system achieved in the second embodiment, which includes an element control unit 37 utilized to turn on/off the voltage applied to the electrodes formed at the detection areas 281 to 289 of the condenser optical element 140. Other structural features are identical to those in the block diagram presented in FIG. 5. In the second embodiment, the voltage application is controlled as described above by the element control unit 37 to turn on/off the condensing function (diffracting function) of the condenser optical element 140.

Figure 25A:
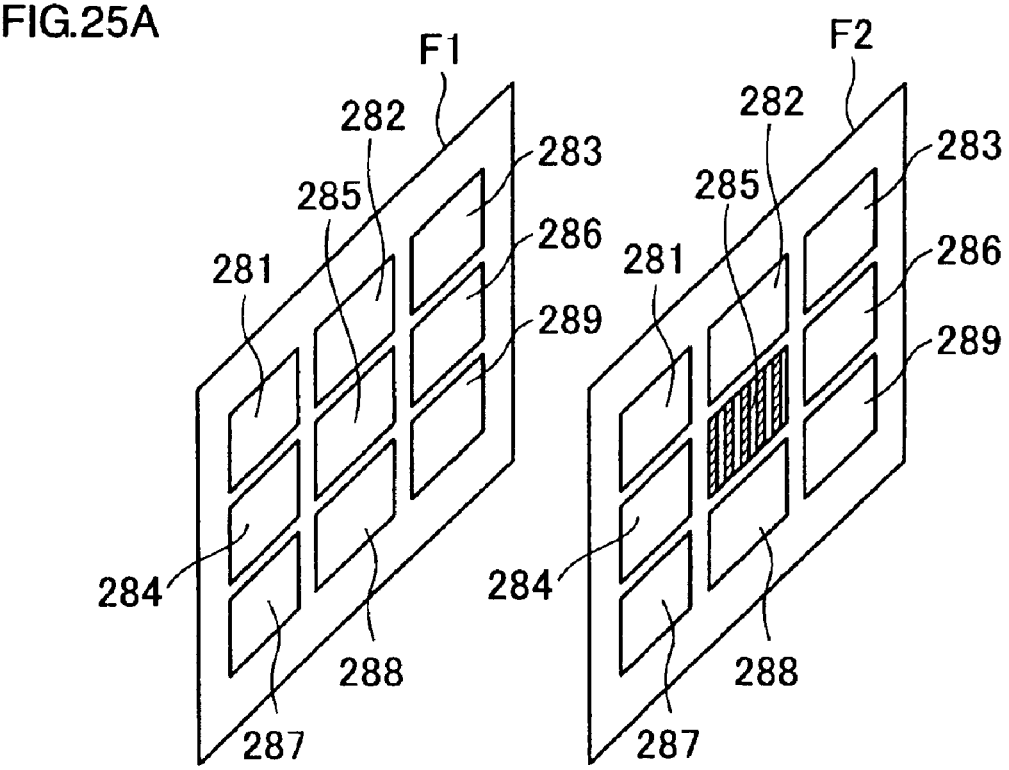
FIG. 25A presents an example of display at the filters F1 and F2 that may be adopted to execute a focusing state detection by displaying a stripe pattern at the filter F2.
Figure 25B:
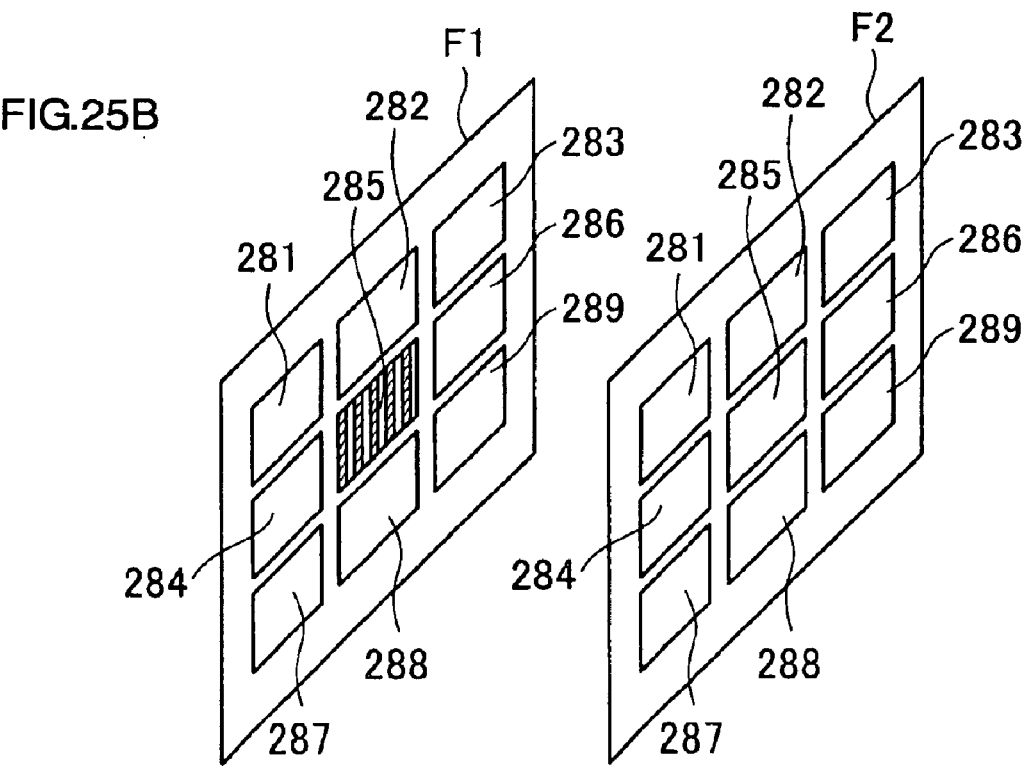
FIG. 25B presents an example of display at the filters F1 and F2 that may be adopted to execute a focusing state detection by displaying a stripe pattern at the filter F1.

When obtaining the spatial frequency component at the filter F2 during a focal adjustment opreation, displays such as those shown in FIG. 25A are achieved at the filters F1 and F2. The filter F1 is set in a full transmission state over its entirety including the detection area 285. At the filter F2, a stripe pattern with a predetermined spatial frequency is displayed in the detection area 285 and the areas other than the detection area 285 are set in a transmission state. In addition, in order to obtain the spatial frequency component at the filter F1, a display similar to the display at the filter F2 in FIG. 25A is achieved at the filter F1 and a display similar to the display at the filter F1 in FIG. 25A is achieved at the filter F2, as shown in FIG. 25B.

Furthermore, as in the first embodiment, a photometering operation may be executed based upon a detection value obtained at the photoelectric conversion element 13 instead of by utilizing the photometering sensor 10. For instance, in order to execute a photometering operation at the detection area 285 set at the center of the condenser optical element 140, the entire areas of the filters F1 and F2 should be set in a transmission state and the voltage application to the detection area 285 at the condenser optical element 140 should be turned off. The light intensity detected by setting the detection area 285 in the full transmission state represents the 0th degree term of the Fourier conversion, i.e., the DC component, which is the light intensity level defined by the detection area 285. Areas other than the detection area 285 at the condenser optical element 140 are sustained in the transmission state by applying a voltage thereto.

In this situation, the subject light flux entering the detection area 285 alone is condensed onto the photoelectric conversion element 13. Exactly the same principle as that of the photometering operation in the detection area 285 applies to a photometering operation of another detection area, i.e., the entire area of the filters F1 and F2 should be set in the transmission state and the voltage application to the detection area at the condenser optical element 140 where the photometering operation is to be executed should be turned off.

In this embodiment, too, a dark state can be created simply by setting the filters F1 and F2 in a fully light blocking state and thus, the effective light intensity alone can be measured as the difference between the full transmission state and the full light blocking state. As a result, a highly accurate photometering operation can be executed.

In addition, by sequentially turning off the voltage application to the individual detection areas 281 to 289 at the condenser optical element 140, photometering values corresponding to the individual detection areas can be obtained. Also, by setting the entire condenser optical element 140 in a transmission state, a photometering operation can be executed through full screen averaging with the photometering sensor 10. It is to be noted that if the photoelectric conversion element 13 is also utilized as a photometering sensor and a range finding sensor as in the first embodiment, the photoelectric conversion element 13 may be disposed at the position at which the photometering sensor 10 is located in FIG. 1.

Advantages similar to those of the first embodiment are achieved by adopting the second embodiment. The second embodiment also achieves the following advantage. Namely, by controlling the on/off of the voltage application at the condenser optical element 140, the subject light flux entering the detection area that is needed for the focal point detection alone is guided to the photoelectric conversion element 13 and the subject light flux entering the remaining area is guided to the viewfinder optical system. Thus, the photographer checking the viewfinder image sees a natural-looking image. Moreover, when executing the AF measurement by using a single color light with a wavelength of, for instance, approximately 540 nm, it is possible to ensure that the detection area being used in the focal point detection does not appear dark by diffracting the light with a wavelength of approximately 540 nm with a hologram at the detection areas 281 to 289.

Third Embodiment

Figure 26:
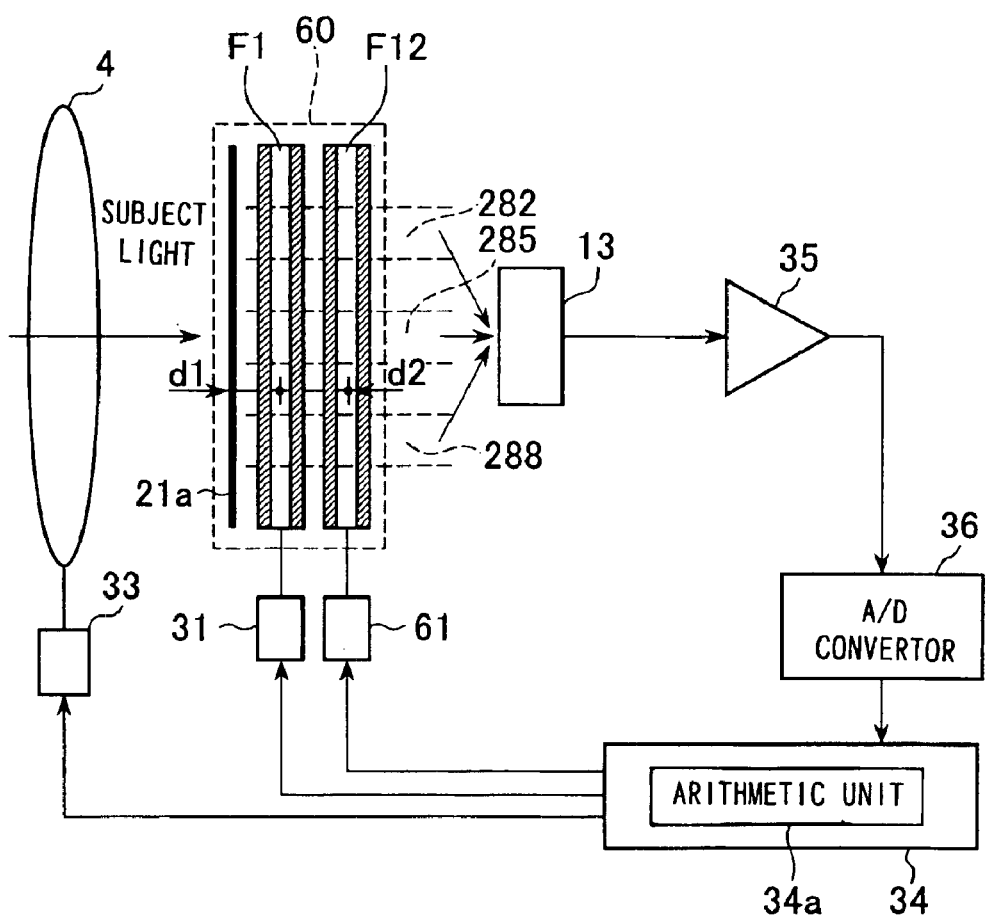
FIG. 26 is a block diagram of the AF system achieved in a third embodiment.

FIG. 26 is a block diagram similar to that presented in FIG. 24, showing the AF system achieved in the third embodiment of the present invention. It is to be noted that the same reference numerals are assigned to components identical to those in the second embodiment, and the following explanation focuses on the differences. Reference numeral 60 in FIG. 26 indicates a liquid crystal optical member having a filter F1 and a filter F12. As detailed later, the filter F12 in the third embodiment has the function of the filter 2 and the function of the condenser optical element 140 in FIG. 24. The distance between the filter F1 and the viewfinder screen 21a is set to d1, and the distance between the filter F1 and the filter F12 is set to d2. The operation of the filter F12 is controlled by a filter control unit 61.

Figure 27:
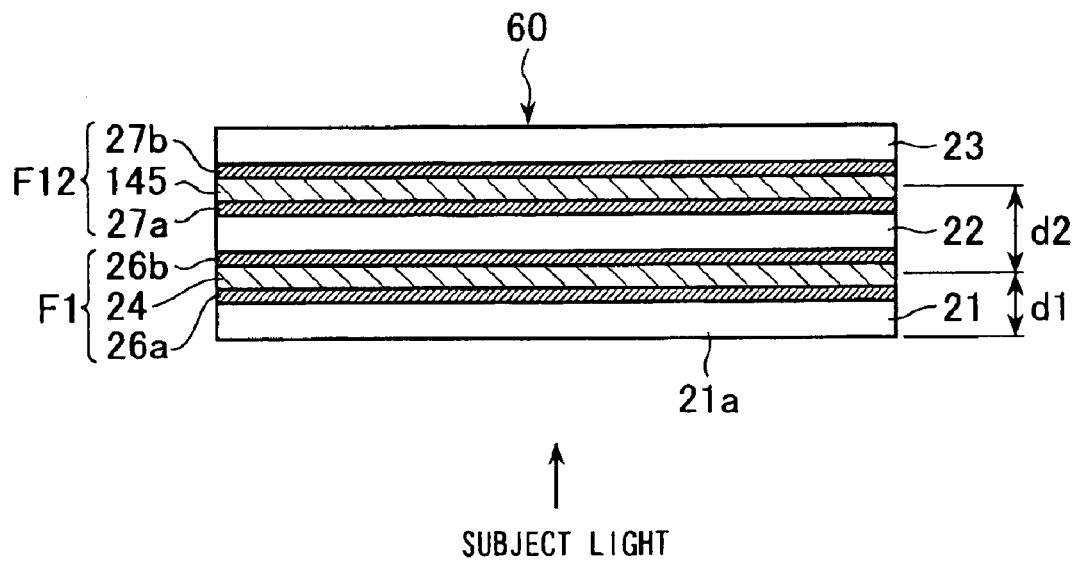
FIG. 27 is a sectional view of a liquid crystal optical member 60.
Figure 28:
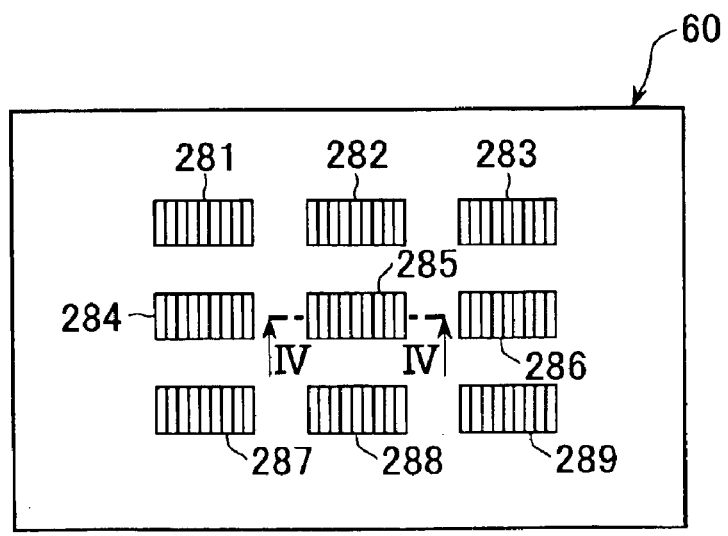
FIG. 28 is a plan view of the liquid crystal optical member 60.

FIG. 27 is a sectional view of the liquid crystal optical member 60, and FIG. 28 is a plan view of the liquid crystal optical member 60. The filter F1 adopts a structure identical to that of the filter F1 in the second embodiment. The filter F12, on the other hand, adopts a structure achieved by replacing the liquid crystal layer 25 in the filter F2 in the second embodiment with a polymer dispersion liquid crystal member 145.

(Filter Operations)

Figure 29:
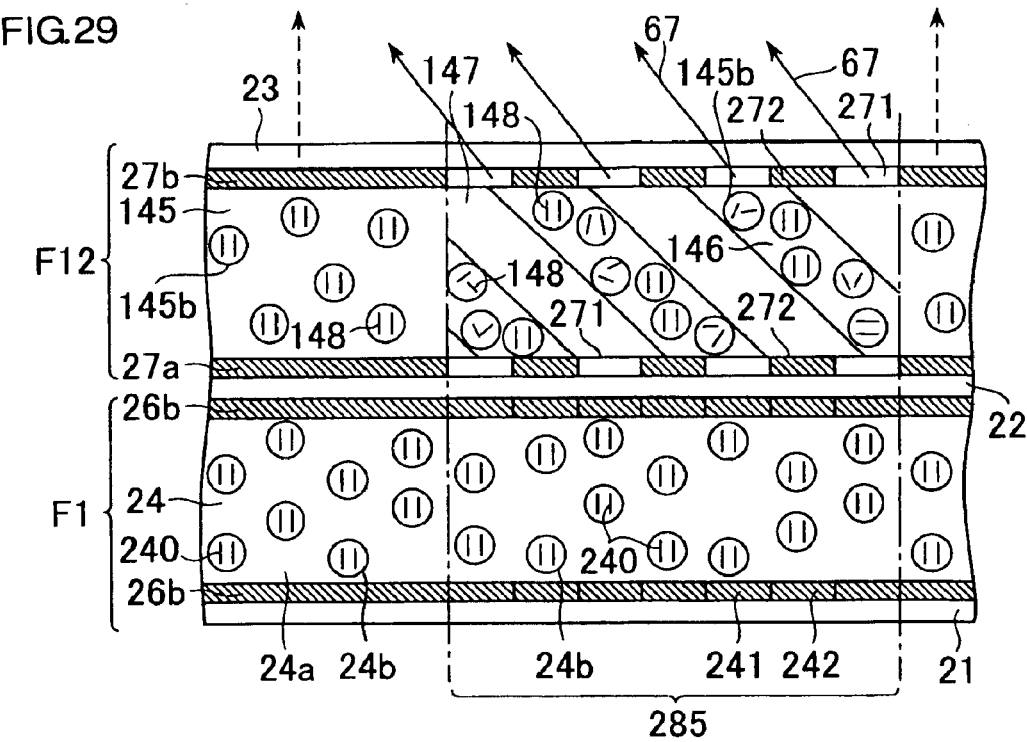
FIG. 29 is a sectional view taken along IV—IV in FIG. 28, with a stripe pattern formed at the detection area 285 of the filter F12 and the detection area 285 of the filter F1 set in a transmission state.
Figure 30:
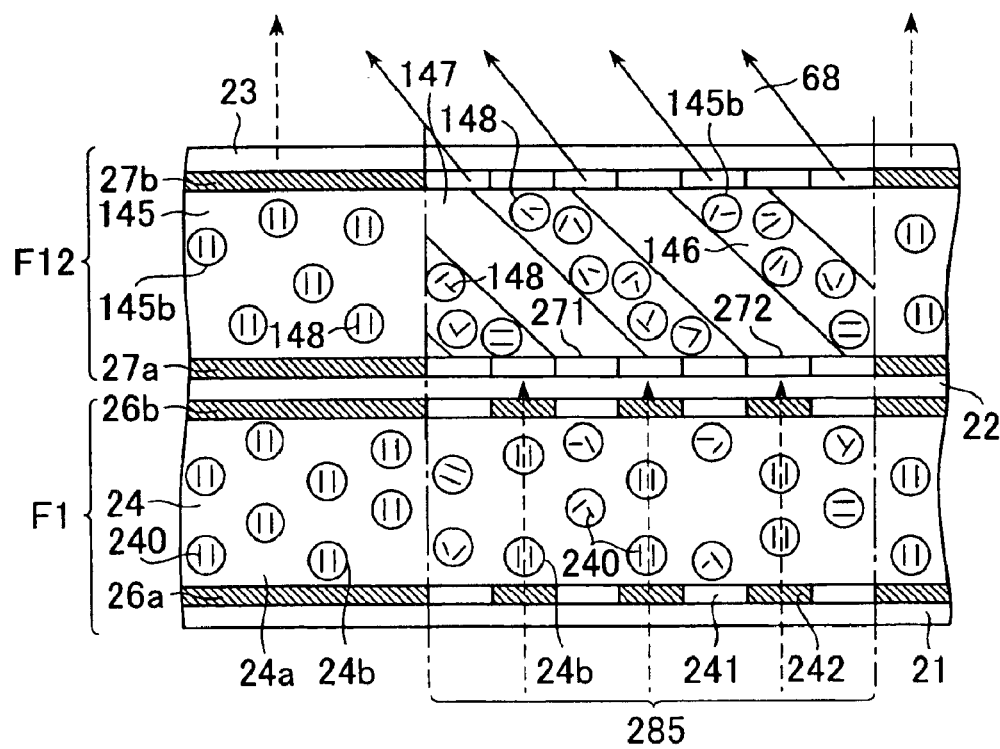
FIG. 30 is a sectional view taken along IV—IV in FIG. 28, with a stripe pattern formed at the detection area 285 of the filter F1.

Next, an explanation is given on how the filters F1 and F12 are engaged during an AF operation. An explanation is given on an AF operation executed based upon the subject light flux at the detection area 285 in reference to the third embodiment as well. FIGS. 29 and 30 illustrate the operations of the filters F1 and F12 in schematic sectional views taken along IV—IV in FIG. 28. In the second embodiment explained earlier, the image forming position is ascertained through an arithmetic operation executed by using the detection values obtained when the stripe pattern is formed at the filter F2 and the detection values obtained when the stripe pattern is formed at the filter F1. In the third embodiment, the image forming position is calculated based upon the detection values obtained by forming a stripe pattern at the filter F12 and the detection values obtained by forming the stripe pattern at the filter F1.

FIG. 29 is a sectional view taken along IV—IV, showing the stripe pattern formed at the detection area 285 at the filter F12, with the detection area 285 at the filter F1 being set in a transmission state. The remaining areas at the filters F1 and F12 other than the detection area 285 are set in a transmission state through a voltage application to the electrodes thereat. At the liquid crystal layer 24 in the filter F1, the liquid crystal particles 24b are uniformly dispersed in the high molecule polymer 24a. The liquid crystal particles 24b each contain numerous liquid crystal molecules 240.

The voltage is applied to the shaded areas of the transparent conductive films 26a, 26b, 27a and 27b and no voltage is applied to the non-shaded areas in FIG. 29. At the filter F1, the voltage is applied to the entire liquid crystal 24, orienting the liquid crystal molecules 240 in the liquid crystal particles 24b along the direction in which the electrical field is generated (along the vertical direction in the figure). As a result, the entire filter F1 including the detection area 285 is in a transmission state, allowing the subject light flux having entered therein to be transmitted through the filter F1 and enter the filter F12.

At the filter F12, the areas other than the detection area 285 are in a transmission state due to a voltage applied thereto but a stripe pattern is formed at the detection area 285 with electrode pattern areas 271 to which no voltage is applied and electrode pattern areas 272 to which the voltage is applied. Thus, liquid crystal molecules 148 in the liquid crystal particles 145b present in the areas located between electrode pattern areas 272 are oriented along the electrical field. However, the orientation of the liquid crystal molecules 148 in the liquid crystal particles 145b present in the areas enclosed between the electrode pattern areas 271 is random.

As a result, the striped subject light flux having entered the electrode pattern areas 272 in the detection area 285 is transmitted upward whereas the striped subject light flux 67 having entered the electrode pattern areas 271 becomes deflected due to the diffracting function achieved with the layers 146 and 147 and is condensed onto the photoelectric conversion element 13 (not shown). The subject light flux 67 is modulated through the stripe pattern formed in the electrode pattern areas 271 and 272 and has a spatial frequency component corresponding to the spatial wavelength of the stripe pattern. Thus, focal adjustment information similar to that obtained by forming the stripe pattern at the filter F2 in the second embodiment can be generated.

Once the spatial frequency component at the filter F12 is ascertained, the stripe pattern is formed at the detection area 285 at the filter F1, as shown in FIG. 30 to obtain the spatial frequency component at the filter F1. At this time, no voltage is applied to the electrode pattern areas 271 and 272 in the detection area 285 and the voltage is applied to the remaining area in the same manner as illustrated in FIG. 29 at the filter F12. Consequently, the subject light flux having entered the filter F12 from the filter F1 is transmitted through the filter F12 without becoming diffracted over areas other than the detection area 285.

In the detection area 285 at the filter F12, the individual liquid crystal molecules 148 are randomly oriented. For this reason, the subject light flux having been modulated at the filter F1 and then entered the filter F12 becomes diffracted due to the diffracting effect achieved with the layers 146 and 147. As a result, the subject light flux 68 at the detection area 285 becomes deflected and is condensed onto the photoelectric conversion element 13.

(Photometering Operation)

Next, a photometering operation executed in the third embodiment by using the detection value obtained at the photoelectric conversion element 13 is explained. The following explanation is given on a photometering operation executed by using the subject light at the detection area 285. The voltage is applied to the entire area of the filter F1 to set the entire filter F1 in a transmission state (transparent state). At the filter F12, no voltage is applied to the detection area 285 and the voltage is applied to the remaining areas, in the same manner as illustrated in FIG. 30. Thus, only the subject light having been transmitted through the detection area 285 is condensed onto the photoelectric conversion element 13.

It is to be noted that the photometering operation may be executed by setting the detection area 285 alone in a transmission state at the filter F1. While the viewfinder becomes dark during the photometering operation, which is less than desirable, any influence of the light at areas other than the detection area 285 can be eliminated in this case.

Figure 31:
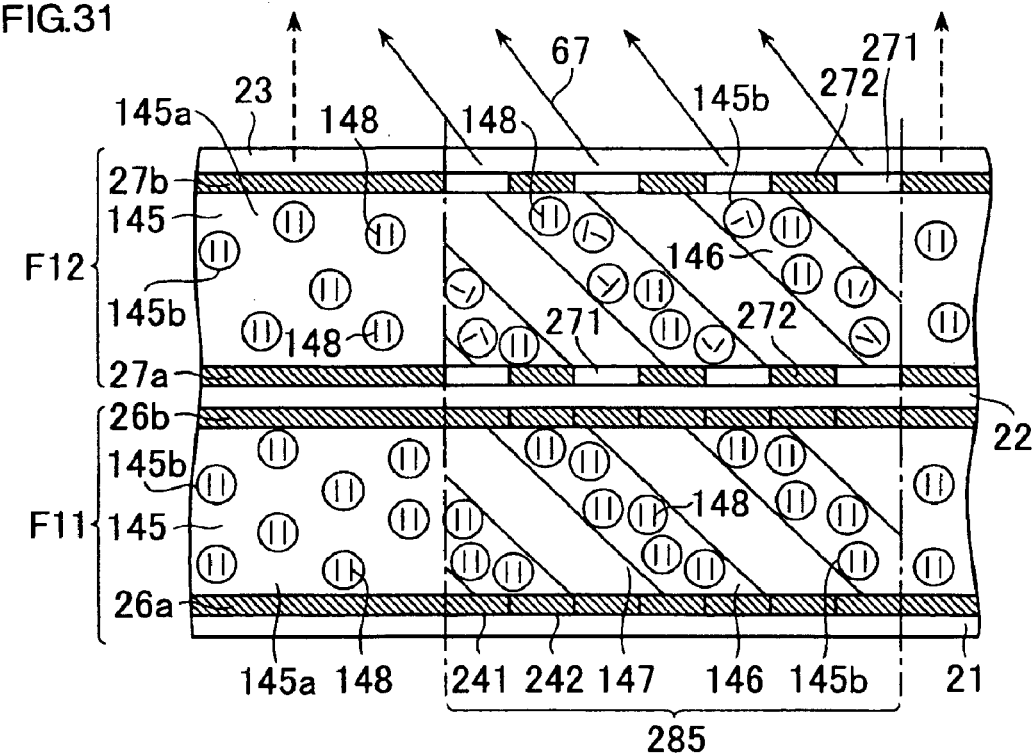
FIG. 31 is a sectional view taken along IV—IV in FIG. 28 of a liquid crystal optical member which includes filters F11 and F12 when the high frequency component is obtained at the filter F12.
Figure 32:
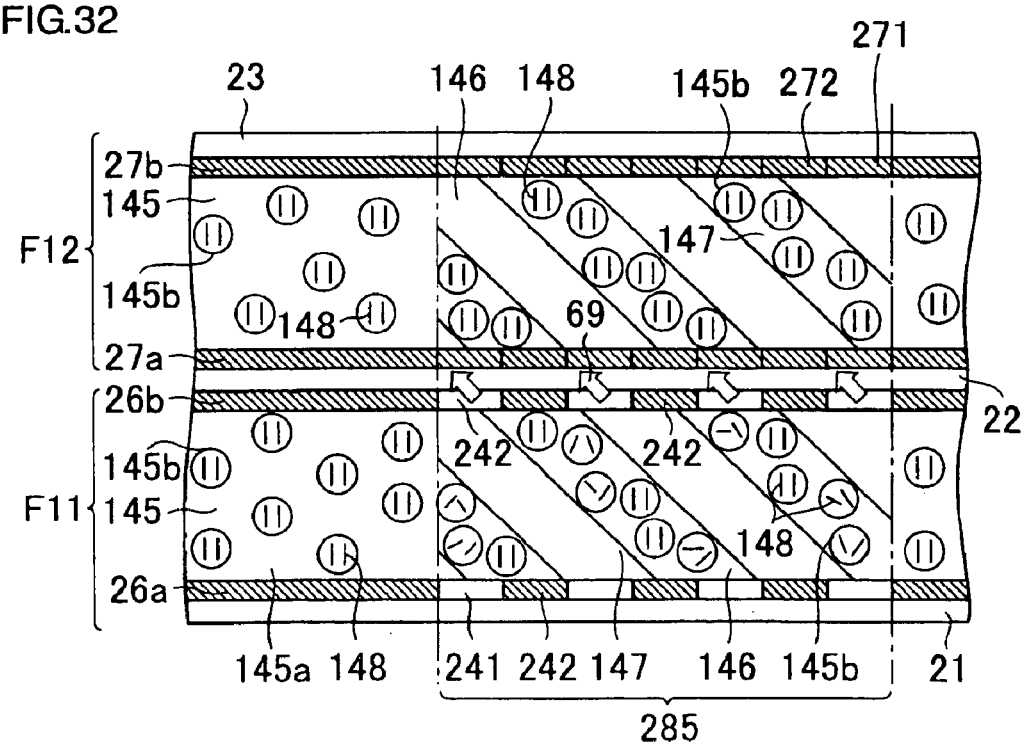
FIG. 32 is a sectional view taken along IV—IV in FIG. 28 of the liquid crystal optical member which includes the filters F11 and F12 when the high frequency component is obtained at the filter F11.

FIGS. 31 and 32 show a variation of the third embodiment. A filter F1 used in this variation is achieved by replacing the liquid crystal layer 24 at the filter F1 with a polymer dispersion liquid crystal member 145. The filter F1 and the filter F12 adopt structures identical to each other in this example.

When detecting the high frequency component at the filter F12, the state of the voltage application at the filter F12 in FIG. 31 is exactly the same as the voltage application state in the filter F12 in FIG. 29. As a result, the liquid crystal molecules 148 are oriented randomly in the areas enclosed between the electrode pattern areas 271 to which no voltage is applied. In the areas enclosed between the the electrode pattern areas 272 to which the voltage is applied, the liquid crystal molecules 148 are all oriented along the electrical field (along the vertical direction in the figure).

At the filter F11, the voltage is applied to both the electrode pattern inside the detection area 285 and the electrode patterns in areas other than the detection area 285. Thus, the entire area at the filter F11 is in a transmission state, allowing the subject light flux having entered the filter F11 to be transmitted through the filter F11 and enter the filter F12. Since the stripe pattern is formed with the layers 146 and 147 as explained earlier at the detection area 285 of the filter F12, the subject light flux 67 exiting the transmitting portions of the stripe pattern becomes diffracted and is deflected toward the photoelectric conversion element 13 (not shown) in the same manner as illustrated in FIG. 29.

FIG. 32 illustrates how the high frequency component is detected at the filter F11. The voltage is applied to the entire filter F12 including the electrode pattern areas 271 and 272 in the detection area 285 and the electrode in areas other than the detection area 285 and thus the entire filter F12 are set in a transmission state. In addition, no voltage is applied to the electrode pattern areas 241 and the voltage is applied to the electrode pattern areas 242 at the filter F11. The area other than the detection area 285 at the filter F11 are set in a transmission state by the voltage applied thereto.

As a result, of the subject light flux having entered the detection area 285, the subject light 68 having entered the transmitting portions of the stripe pattern formed at the detection area 285, i.e., the light having entered the electrode pattern areas 242, alone is transmitted through the filter F1. This subject light flux 68 is diffracted through the effect achieved by the layers 146 and 147 and becomes deflected toward the photoelectric conversion element 13. The deflected subject light flux 69 is transmitted through the filter F12 which is in a transmission state over its entirety and is condensed onto the photoelectric conversion element 13.

As described above, in addition to the advantages of the second embodiment, the third embodiment achieves the following advantage. Namely, since the filters F12 and F11 also achieve the function of the condenser optical element 14, a special condenser optical element 14 does not need to be provided in addition to the filters F1 and F2, and thus a reduction in the number of required parts over the first embodiment can be achieved.

It is to be noted that while an explanation is given above in reference to the embodiments on an example in which the present invention is adopted in a digital camera, the focal point detection device according to the present invention may also be adopted in a single lens reflex camera using silver halide film. In addition, as long as the features characterizing the present invention are not compromised, the present invention is not limited to the embodiments described above in any way whatsoever.

What is claimed is:

1. A camera comprising:

a spatial modulation optical filter that is disposed in a viewfinder optical system for subject observation at or near a position optically equivalent to an estimated image forming plane of a photographic optical system and modulates a subject light flux entering via the photographic optical system with transmission characteristics to obtain a light flux having a predetermined spatial frequency;

a photoelectric conversion device that outputs a signal corresponding to detected light;

an optical element that guides the subject light flux having been modulated at the spatial modulation optical filter to the photoelectric conversion device; and a focal adjustment state calculation device that calculates a focal adjustment state of the photographic optical system based upon the signal output from the photoelectric conversion device having received the modulated subject light flux.

2. A camera according to claim 1, wherein:

the spatial modulation optical filter modulates a light flux that passes through at least one of a plurality of divided areas within a photographic image plane defined by the photographic optical system.

3. A camera according to claim 1, further comprising:

a plurality of the spatial modulation optical filters being disposed along an optical axis of the photographic optical system, and a light flux modulation control unit that individually controls modulation of the subject light flux and detection of the modulated light flux at the photoelectric conversion device in correspondence to each of the spatial modulation optical filters, wherein:

the focal adjustment state calculation device calculates the focal adjustment state of the photographic optical system based upon output signals obtained from the photoelectric conversion device in correspondence to the individual spatial modulation optical filters.

4. A camera according to claim 1, wherein:

the focal adjustment state calculation device calculates a light quantity of the modulated light flux detected at the photoelectric conversion device; and the camera further comprises:

an autofocus control device that executes a focus operation by moving a focus lens in the photographic optical system to a target focus position set at a focus lens position at which the light quantity calculated by the focal adjustment state calculation device achieves a largest value.

5. A camera according to claim 3, wherein:
the focal adjustment state calculation device calculates a light quantity of the modulated light flux detected at the photoelectric conversion device; and
the camera further comprises:
an AF calculation unit that calculates a focus lens position at which the light quantity of the modulated light flux detected at the photoelectric conversion device achieves the largest value based upon results of a calculation executed by the focal adjustment state calculation device; and
an autofocus control device that moves a focus lens in the photographic optical system to the focus lens position calculated by the AF calculation unit.

6. A camera according to claim 3, wherein:
the spatial modulation optical filters are each constituted with a transmission liquid crystal display panel so as to modulate the subject light flux by using a display pattern having transmission characteristics with a predetermined spatial frequency displayed at the liquid crystal display panel.

7. A camera according to claim 6, wherein:
the light flux modulation control unit is capable of implementing control so as to achieve a first display state in which the display pattern having the transmission characteristics with the predetermined spatial frequency is displayed and a second display state in which the subject light flux is allowed to be transmitted; and
the camera further comprises:
a photometric operation unit that executes a photometric operation on the subject light flux based upon the signal output from the photoelectric conversion device in the second display state.

8. A camera according to claim 1, wherein:
the spatial frequency at the spatial modulation optical filter is adjustable.

9. A focal point detection device comprising:
a spatial modulation optical filter that is disposed in a viewfinder optical system for subject observation at or near a position optically equivalent to an estimated image forming plane of a photographic optical system and can be set in one of a modulation state in which a subject light flux entering via the photographic optical system is modulated with transmission characteristics to obtain a light flux having a predetermined spatial frequency and a transmission state in which the subject light flux is transmitted through;
a photoelectric conversion device that outputs a signal corresponding to detected light;
an optical element that guides the subject light flux having been modulated at the spatial modulation optical filter to a detection surface of the photoelectric conversion device and guides the subject light flux having been transmitted through the spatial modulation optical filter to the viewfinder optical system; and
a focal adjustment state calculation device that calculates a focal adjustment state of the photographic optical system based upon the signal output from the photoelectric conversion device having received the subject light flux that has been modulated at the spatial modulation optical filter.

10. A focal point detection device according to claim 9, wherein:
the spatial modulation optical filter modulates a light flux that passes through at least one of a plurality of divided areas within a photographic image plane defined by the photographic optical system.

11. A focal point detection device according to claim 9, wherein:
the optical element is an element, optical anisotropic characteristics of which change in correspondence to an electrical field applied to the element; and
the focal point detection device further comprises:
an optical element control device that controls the electrical field applied to the optical element so as to guide the subject light flux having been modulated at the spatial modulation optical filter to the detection surface of the photoelectric conversion device and to guide the subject light flux having been transmitted through the spatial modulation optical filter to the viewfinder optical system.

12. A focal point detection device according to claim 9, wherein:
a viewfinder screen of a camera is to be disposed at a position optically equivalent to the estimated image forming plane of the photographic optical system.

13. A focal point detection device according to claim 11, wherein:
the optical element is a polymer dispersion liquid crystal constituted of an isotropic polymer and an optically anisotropic liquid crystal achieving refractive indices substantially equal to each other for refracting the subject light flux when the electrical field is applied, which includes a diffraction grating having layers constituted of the isotropic polymer and layers constituted of the liquid crystal disposed in regular order at least in a focal point detection area; and
the optical element control device controls the electrical field applied to the diffraction grating so as to guide the subject light flux having been modulated at the spatial modulation optical filter to the detection surface of the photoelectric conversion device and to guide the subject light flux having been transmitted through the spatial modulation optical filter to the viewfinder optical system.

14. A focal point detection device according to claim 13, wherein:
the isotropic polymer layers and the liquid crystal layers that together function as the diffraction grating are constituted as a hologram formed as a result of interference occurring between parallel light entering the optical element at a right angle to the optical element and a light flux radiated from a point light source provided at a position at which the photoelectric conversion device is to be located.

15. A focal point detection device comprising:
a photoelectric conversion device that outputs a signal corresponding to a light quantity of detected light;
a polymer dispersion liquid crystal panel that is disposed in a viewfinder optical system for subject light flux observation at or near a position optically equivalent to an estimated image forming plane of a photographic optical system and is constituted with an isotropic polymer and an optically anisotropic liquid crystal achieving refractive indices substantially equal to each other for refracting a subject light flux when an electrical field is applied;
a diffraction grating disposed at least at a focal point detection area of the polymer dispersion liquid crystal panel, which includes layers constituted of the isotropic polymer and layers constituted of the liquid crystal disposed in regular order and condenses the subject light flux entering the focal point detection area onto the photoelectric conversion device;

a liquid crystal panel control device that forms at the diffraction grating a diffraction pattern with which the subject light flux entering to the diffraction pattern is modulated with transmission characteristics to obtain a light flux having a predetermined spatial frequency by applying an electrical field with a specific pattern to the diffraction grating; and a focal adjustment state calculation device that calculates a focal adjustment state of the photographic optical system based upon the signal output from the photoelectric conversion device.

16. A focal point detection device according to claim 15, wherein:

the liquid crystal panel control device can be set in one of an application mode in which the electrical field with the specific pattern is applied to the diffraction grating and an application OFF mode in which application of the electrical field to the diffraction grating is stopped; and the focal point detection device further comprises:

a photometric operation unit that executes a photometric operation on the subject light flux based upon the signal output from the photoelectric conversion device in the application OFF mode.

17. A focal point detection device according to claim 15, further comprising:

a spatial modulation optical filter that is disposed further toward a subject relative to the polymer dispersion liquid crystal panel and can be set in one of a modulation state in which the subject light flux in the focal point detection area is modulated with transmission characteristics to obtain a light flux having a predetermined spatial frequency and a transmission state in which the subject light flux is transmitted through, wherein:

the liquid crystal panel control device can be set in one of an application mode in which the electrical field achieving the specific pattern is applied to the diffraction grating in the transmission state and an application OFF mode in which application of the electrical field to the diffraction grating is stopped in the modulation state; and the focal adjustment state calculation device calculates the focal adjustment state in the photographic optical system based upon the signal output from the photoelectric conversion device in the application mode and the signal output from the photoelectric conversion device in the application OFF mode.

18. A camera comprising:

a spatial modulation optical filter that is disposed in a viewfinder optical system for subject observation at or near a position optically equivalent to an estimated image forming plane of a photographic optical system and modulates a subject light flux entering via the photographic optical system with transmission characteristics to obtain a light flux having a predetermined spatial frequency;

a photoelectric conversion device that outputs a singal corresponding to detected light;

an optical element that guides the subject light flux having been modulated at the spatial modulation filter to the photoelectric conversion device; and a focal adjustment state calculation means that calculates a focal adjustment state of the photographic system based upon the signal output from the photoelectric conversion device having received the modulated subject light flux.

19. A focal point detection device comprising:

a spatial modulation optical filter that is disposed in a viewfinder optical system for subject observation at or near a position optically equivalent to an estimated image forming plane of a photographic optical system and can be set in one of a modulation state in which a subject light flux entering via the photographic optical system is modulated with transmission characteristics to obtain a light flux having a predetermined spatial frequency and a transmission state in which the subject light flux is transmitted through;

a photoelectric conversion device that outputs a signal corresponding to detected light;

an optical element that guides the subject light flux having been modulated at the spatial modulation optical filter to a detection surface of the photoelectric conversion device and guide the subject light flux having been transmitted through the spatial modulation optical filter to the viewfinder optical system; and a focal adjustment state calculation means that calculates a focal adjustment state of the photographic optical system based upon the signal output from the photoelectric conversion device having received the subject light flux that has been modulated at the spatial modulation optical fiber.

20. A focal point detection device comprising:

a photoelectric conversion device that outputs a signal corresponding to a light quantity of detected light;

a polymer dispersion liquid crystal panel that is disposed in a viewfinder optical system for subject light flux observation at or near a position optically equivalent to an estimated image forming plane of a photographic optical system and is constituted with an isotropic polymer and and optically anisotropic liquid crystal achieving refractive indices substantially equal to each other for refracting a subject light flux when an electrical field is applied;

a diffraction grating disposed at least at a focal point detection area of the polymer dispersion liquid crystal panel, which includes layers constituted of the isotropic polymer and layers constituted of the liquid crystal disposed in regular order and condenses the subject light flux entering the focal point detection area onto the photoelectric conversion device;

a liquid crystal panel control means that forms at the diffraction grating a diffraction pattern with which the subject light flux entering to the diffraction pattern is modulated with transmission characteristics to obtain a light flux having a predetermined spatial frequency by applying an electrical field with a specific pattern to the diffraction grating; and a focal adjustment state conclusion means that calculates a focal adjustment state of the photographic optical system based upon the signal output from the photoelectric conversion device.

* * * * *